US011930740B2

(12) United States Patent
Shinya et al.

(10) Patent No.: US 11,930,740 B2
(45) Date of Patent: Mar. 19, 2024

(54) THRESHING APPARATUS

(71) Applicant: Kubota Corporation, Osaka (JP)

(72) Inventors: Mamoru Shinya, Sakai (JP); Yusaku Yoshida, Sakai (JP); Tsuyoshi Kumatori, Sakai (JP); Takashi Kitahara, Sakai (JP); Yoshifumi Tango, Sakai (JP); Ryohei Higashitaki, Sakai (JP); Toshinari Nishimura, Sakai (JP); Masakazu Hino, Sakai (JP); Shota Hayashi, Sakai (JP); Nobuki Kitamura, Sakai (JP)

(73) Assignee: Kubota Corporation, Osaka (JP)

( * ) Notice: Subject to any disclaimer, the term of this patent is extended or adjusted under 35 U.S.C. 154(b) by 473 days.

(21) Appl. No.: 17/262,456

(22) PCT Filed: Jul. 22, 2019

(86) PCT No.: PCT/JP2019/028643
§ 371 (c)(1),
(2) Date: Jan. 22, 2021

(87) PCT Pub. No.: WO2020/022258
PCT Pub. Date: Jan. 30, 2020

(65) Prior Publication Data
US 2021/0227753 A1 Jul. 29, 2021

(30) Foreign Application Priority Data

Jul. 24, 2018 (JP) ................. 2018-138817
Jul. 24, 2018 (JP) ................. 2018-138818
Jul. 27, 2018 (JP) ................. 2018-141242

(51) Int. Cl.
A01F 12/46 (2006.01)
A01F 12/60 (2006.01)
(Continued)

(52) U.S. Cl.
CPC .............. *A01F 12/46* (2013.01); *A01F 12/60* (2013.01); *A01D 69/06* (2013.01); *A01F 12/52* (2013.01)

(58) Field of Classification Search
CPC .......... A01F 12/46; A01F 12/60; A01F 12/52; A01D 69/06; A01D 41/1208; A01D 41/1217
See application file for complete search history.

(56) References Cited

U.S. PATENT DOCUMENTS 1,811,064 A * 6/1931 Raney ..................... A01F 12/46
198/661
4,466,447 A * 8/1984 Hoefer .................... A01F 12/52
460/13
(Continued)

FOREIGN PATENT DOCUMENTS

CA 2242473 A1 * 1/2000 ................ B60P 1/40
CA 2457279 A1 * 8/2004 ................ B60P 1/40
(Continued)

Primary Examiner — Arpad Fabian-Kovacs
(74) Attorney, Agent, or Firm — The Webb Law Firm

(57) ABSTRACT

The combine may include a threshing tank that is configured to store a threshing product obtained by the threshing device and includes a lower tapered portion formed in a bottom portion. A bottom screw is provided inside the lower tapered portion and configured to discharge the threshing product from the threshing tank. A threshing discharge device is connected to the bottom screw and configured to convey the threshing product from the bottom screw and discharge the threshing product in a body outward direction. The threshing tank includes an inspection port formed in a bottom section of the lower tapered portion, and a lid configured to open and close the inspection port, and the lid opens and closes by swinging upward and downward about a swing axis that is not parallel with a screw axis of the bottom screw.

7 Claims, 25 Drawing Sheets

(51) Int. Cl.
    *A01D 69/06*    (2006.01)
    *A01F 12/52*    (2006.01)

(56)         References Cited

U.S. PATENT DOCUMENTS 5,797,480   A  *   8/1998   Gaddis .................. B65G 65/46
                                                        198/860.4
    7,395,650   B2 *   7/2008   Mossman ............ A01D 45/021
                                                          56/119
    7,585,213   B2 *   9/2009   Claerhout ............... A01F 12/44
                                                          460/103
    8,858,310   B2 * 10/2014    Cooksey ............... A01F 12/46
                                                          460/103
    9,510,514   B2 * 12/2016    Temple .............. A01D 41/1208
    2004/0184905 A1*  9/2004    Kinzenbaw ............... B60P 1/40
                                                          414/526
    2009/0280876 A1* 11/2009    Yoder .................. A01F 12/444
                                                          460/100

FOREIGN PATENT DOCUMENTS

| CN | 203136581 U | * | 8/2013 | ............ A01F 12/46 |
| CN | 203675628 U | * | 7/2014 | ............ A01F 41/12 |
| CN | 103026853 B |   | 9/2015 | |
| DE | 102010009288 A1 | | 12/2010 | |
| JP | 4740454 | | 12/1972 | |
| JP | 5537364 U | | 3/1980 | |
| JP | 59163355 U | | 11/1984 | |
| JP | 62100212 A | | 5/1987 | |
| JP | 200014230 A | | 1/2000 | |
| JP | 2002058333 A | * | 2/2002 | ............ A01F 12/52 |
| JP | 2005176736 A | * | 7/2005 | ............ A01F 12/46 |
| JP | 200774944 A | | 3/2007 | |
| JP | 2011229429 A | | 11/2011 | |
| JP | 2013123414 A | * | 6/2013 | ............ A01F 12/46 |
| JP | 2013183714 A | | 9/2013 | |
| JP | 2014108075 A | * | 6/2014 | ............ A01F 12/46 |
| JP | 2014117270 A | | 6/2014 | |
| JP | 5984656 B2 | | 8/2016 | |
| JP | 2017198171 A | | 11/2017 | |

* cited by examiner

THRESHING APPARATUS

CROSS-REFERENCE TO RELATED APPLICATIONS

This application is the United States national phase of International Application No. PCT/JP2019/028643 filed Jul. 22, 2019, and claims priority to Japanese Patent Application Nos. 2018-138817 filed Jul. 24, 2018, 2018-138818 filed Jul. 24, 2018, and 2018-141242 filed Jul. 27, 2018, the disclosures of which are hereby incorporated by reference in their entirety.

BACKGROUND OF THE INVENTION

Field of the Invention

The present invention relates to a combine that is provided with a threshing device for threshing a harvested product harvested by a harvesting unit and a threshing tank for storing the threshing obtained by the threshing device.

The present invention also relates to a combine provided with a threshing device for threshing a harvested product harvested by a harvesting unit, a threshing tank for storing the threshing, and a supply/convey device that extends between the threshing device and the threshing tank and is for supplying the threshing obtained by the threshing device to the threshing tank.

The present invention also relates to a harvester for harvesting a planted crop while traveling.

Description of Related Art

[1] In one example of the combine mentioned above, the combine is provided with a lower tapered portion formed at the bottom portion of the threshing tank, a bottom screw that is provided inside the lower tapered portion and is for discharging threshing from the threshing tank, and a threshing discharge device that is connected to the bottom screw and is for conveying threshing from the bottom screw and discharging it to the outside of the machine body. This combine is configured such that the threshing stored in the threshing tank is discharged from the threshing tank by the bottom screw and the threshing discharge device.

As shown in JP 2011-229429A (Patent Document 1) for example, some combines of this type are provided with an inspection port (maintenance opening in Patent Document 1) in the lower tapered portion (bottom portion in Patent Document 1) of the threshing tank (grain tank in Patent Document 1), and a lid that opens and closes the inspection port. This makes it possible to perform cleaning to remove threshing remaining in the lower tapered portion through the inspection port, for example.

[2] As shown in JP 2013-183714A (Patent Document 2) for example, in one example of the combine mentioned above, the supply/convey device (lifting device in Patent Document 2) is provided with a conveying case (conveyor case in Patent Document 2), a drive rotating body (drive sprocket in Patent Document 2), a driven rotating body (driven sprocket in Patent Document 2) provided in the upper end portion of the conveying case, an endless rotating body (endless roller chain in Patent Document 2) that is wound around the drive rotating body and the driven rotating body, and conveying bodies (conveying plates in Patent Document 2) that are supported by the endless rotating body and convey threshing.

[3] The all-culm input type (ordinary type) combine described in JP 2017-198171A (Patent Document 3) is a known example of the harvester mentioned above. In this combine, a driving cabin is provided at the front portion of the body frame, and a threshing device is provided rearward thereof. A feeder is located below the driving cabin, and a transmission is arranged below the feeder.

Patent Document 1: JP 2011-229429A
Patent Document 2: JP 2013-183714A
Patent Document 3: JP 2017-198171A

SUMMARY OF THE INVENTION

[1] The following are issues corresponding to Background Art [1].

In the above-mentioned combine, a configuration is conceivable in which the lid is opened and closed by swinging about an axis that is parallel with the screw axis of the bottom screw. In this case, in order to realize a combine in which the lid opens and closes smoothly, it is necessary that a hinge member that swingably supports the lid to the lower tapered portion is provided at multiple locations on the lid along the conveying direction of the bottom screw, and that the length of the hinge members corresponds to the length of the lid along the screw axis of the bottom screw. The pivoting structure of the lid is therefore large.

One aspect of the present invention provides a combine in which a pivoting structure that is compact and simple enables the lid to open and close smoothly.

[2] The following are issues corresponding to Background Art [2].

In the above-mentioned combine, the tension of the endless rotating body needs to be adjusted when the endless rotating body becomes stretched, for example. When perform the task of adjusting the tension of the endless rotating body, it is conceivable to separately perform an operation for moving one end side of the support shaft of the driven rotating body relative to the conveying case and an operation for moving the other end side of the support shaft of the driven rotating body relative to the conveying case in order to move/adjust the position of the driven rotating body relative to the conveying case to obtain an appropriate tension for the endless rotating body. However, in this case, ends of the support shaft cannot be moved in parallel. For this reason, in order to move the driven rotating body by a predetermined stroke to obtain an appropriate tension for the endless rotating body, it is necessary to repeatedly perform the operation of moving one end side of the support shaft and the operation of moving the other end side of the support shaft, for example, thus making tension adjustment troublesome.

Another aspect of the present invention provides a combine that makes it possible to easily move the endless rotating body to an appropriate tension state and makes it possible to quickly adjust the tension of the endless rotating body.

[3] The following are issues corresponding to Background Art [3].

In a harvester such as a combine harvester, there is demand for an improvement in work efficiency by increasing the size of a crop processing device such as a threshing device provided on the machine body.

In order to increase the size of the crop processing device without increasing the size of the harvester itself, it is necessary to reduce the size of other devices or reduce the amount of empty space between devices. If the amount of empty space between devices is reduced, it becomes difficult for a hand or a tool to enter the space between the devices, which may reduce the ease-of-maintenance. For example, a mechanism for transmitting operation force from an operation lever provided in the driving cabin to the transmission is arranged in the vicinity of the transmission, and if the amount of empty space around the transmission is reduced, ease-of-maintenance for that mechanism decreases.

In view of the above-described circumstances, an object of the present invention is to provide a harvester that has an improved ease-of-maintenance for the mechanism for transmitting the operating force by making an innovation in the arrangement of that mechanism.

[1] The following is a means for solving the issues corresponding to Issue [1].

A combine according to the present invention includes: a threshing device configured to thresh a harvested product harvested by a harvesting unit; a threshing tank that is configured to store a threshing product obtained by the threshing device, and includes a lower tapered portion formed in a bottom portion; a bottom screw that is provided inside the lower tapered portion and is configured to discharge the threshing product from the threshing tank; and a threshing discharge device that is connected to the bottom screw and is configured to convey the threshing product from the bottom screw and discharge the threshing product in a body outward direction, wherein the threshing tank includes an inspection port formed in a bottom section of the lower tapered portion, and a lid configured to open and close the inspection port, and the lid opens and closes by swinging upward and downward about a swing axis that is not parallel with a screw axis of the bottom screw.

According to this configuration, the lid can be supported by the lower tapered portion so as to swing about a coupling axis that is a pivot axis extending in a direction not parallel with the screw axis. Accordingly, the lid can smoothly open and close while enabling compactness for the lid pivoting structure. Also, when the lid is opened, the lid becomes inclined such that the portion of the lid on the side opposite to the swing support point is lower than the inspection port. Accordingly, the lid can be used as a guide member for guiding the downward flow of threshing product that comes out through the inspection port. Accordingly, threshing product can be retrieved without preparing a special guide member.

In the present invention, it is preferable that the lid includes a lid bottom plate portion and a pair of lid side plate portions that rise upward from respective lateral end portions of the lid bottom plate portion, and the pair of lid side plate portions are inclined so as to extend along a side plate portion of the lower tapered portion such that a gap between the lid side plate portions becomes wider toward an upper end side of the lid side plate portions.

According to this configuration, when the lid is in the closed state, the lid side plate portions extend along the side plate portions of the lower tapered portion, thus preventing the lid from becoming misaligned. Accordingly, the inspection port can be reliably closed such that threshing product does not leak out through the inspection port. Also, when the lid is used as a guide member for guiding the downward flow of the threshing product from the inspection port, the threshing product is stopped by the lid side plate portions so as to not be likely to spill out from the lid. Accordingly, the threshing product can be retrieved more easily.

In the present invention, it is preferable that the lid includes an inner lid portion that is located inside the inspection port and is flush with an inward surface of the lid bottom plate portion and an inward surface of the bottom section when the lid is in a closed state, and an outer lid portion that comes into contact with an outward surface of the bottom section around the inspection port, the combine further comprises a hinge member that extends between the lid bottom plate portion and the bottom section and is configured to support the lid to the lower tapered portion so as to be capable of swinging open and closed, a coupling shaft that couples the hinge member to the bottom section projects outward from the bottom section, and a lock mechanism configured to fix the lid in the closed state includes a screw shaft that projects outward from the lower tapered portion, an elongated hole portion formed in the lid side plate portion, and a nut configured to be fastened to the screw shaft that has been inserted through the elongated hole portion.

According to this configuration, when the lid is in the closed state, the inward surface of the lid and the inward surface of the bottom section are flush with each other, and the coupling shaft does not protrude into the lower tapered portion. Accordingly, regardless of the existence of the inspection port and the coupling shaft, threshing product smoothly flows inside the lower tapered portion, and the threshing product is not likely to remain inside the lower tapered portion. For this reason, the threshing product can be quickly retrieved and is not likely to remain.

Moreover, when the lid is opened and closed, the lid can be fixed in the closed state and unfixed from the closed state by operating the nut from outside the lid side plate portions. For this reason, the lid can be opened and closed easily.

In the present invention, it is preferable that the axis is located at an end portion of the lid that is on an upstream side in a conveying direction of the bottom screw.

According to this configuration, when the threshing product remaining inside the lower tapered portion is discharged through the inspection port by rotation of the bottom screw, the threshing product being pushed by the bottom screw is pushed in a direction conforming to the inclined direction of the open lid. Accordingly, the threshing product can be retrieved smoothly.

In the present invention, it is preferable that the inspection port is biased toward a side on which the threshing discharge device is located relative to a center of the bottom section in a conveying direction of the bottom screw.

According to this configuration, when the threshing discharge device and the lower tapered portion are cleaned at the same time, the cleaning can be performed easily because the threshing discharge device and the lid are close to each other.

[2] The following is a means for solving the issues corresponding to Issue [2].

A combine according to the present invention includes: a threshing device configured to thresh a harvested product harvested by a harvesting unit; a threshing tank configured to store a threshing product; and a supply/convey device that extends between the threshing device and the threshing tank, and is configured to supply a threshing product obtained by the threshing device to the threshing tank, wherein the supply/convey device includes a conveying case, a drive rotating body arranged inside a lower end portion of the conveying case, a driven rotating body arranged in an upper end portion of the conveying case, an endless rotating body wound around the drive rotating body and the driven rotating body, and a conveying body that is supported by the endless rotating body and is configured to convey the threshing product, a support shaft of the driven rotating body is supported by the upper end portion so as to be capable of displacement in a conveying direction, the combine further includes a coupling body that connects two ends of the support shaft, and one position adjustment mechanism configured to perform adjustment for changing a position of the support shaft is provided so as to apply position changing force to the coupling body.

According to this configuration, position changing force from one position adjustment mechanism is applied to the coupling body. The position changing force is transmitted from the coupling body to both ends of the support shaft of the driven rotating body. For this reason, by operating the one position adjustment mechanism, it is possible to move the ends of the support shaft of the driven rotating body in parallel and adjust the position of the driven rotating body relative to the conveying case.

Accordingly, the tension state of the endless rotating body can be easily and quickly adjusted by operating the one position adjustment mechanism.

In the present invention, it is preferable that the coupling body includes a one-side support arm that is provided on an outward side of a portion of an outer circumferential surface of the conveying case from which one end portion of the support shaft protrudes, and that is configured to support the one end portion, an other-side support arm that is provided on an outward side of a portion of an outer circumferential surface of the conveying case from which another end portion of the support shaft protrudes, and that is configured to support the other end portion, and a connecting member that connects the one-side support arm and the other-side support arm, and the position adjustment mechanism applies force to the connecting member.

According to this configuration, position changing force from the position adjustment mechanism is branched by the connecting member and transmitted to the one support arm and the other support arm, and is transmitted from the one support arm to one end of the support shaft, and from the other support arm to the other end of the support shaft. For this reason, the support shaft is moved and adjusted without becoming misaligned with the conveying case. Accordingly, the tension of the endless rotating body can be adjusted smoothly.

In the present invention, it is preferable that the connecting member is provided so as to extend along an outer circumferential surface of the conveying case, and the position adjustment mechanism includes an adjustment rod that extends downward from the connecting member along the outer circumferential surface of the conveying case, and a positioning mechanism that is provided at a lower portion of the adjustment rod and is configured to position the adjustment rod relative to the conveying case.

According to this configuration, the positioning mechanism can operate at a position in the conveying case that is below the position where the driven rotating body is located. The position adjustment mechanism operates by operation of the positioning mechanism. Accordingly, the tension of the endless rotating body can be adjusted from a low position.

In the present invention, it is preferable that the combine further includes: a first holding member that is supported by the conveying case and is configured to hold an intermediate portion of the adjustment rod while allowing relative movement of the adjustment rod; a guide rod that extends in a up-down direction from the support arm; and a second holding member that is supported by the conveying case and is configured to hold the guide rod while allowing relative movement of the guide rod.

According to this configuration, when the adjustment rod is operated by the positioning mechanism and operation force is transmitted to the connecting member, deformation caused by reaction force is prevented by the first holding member during the transmission of the operation force. Also, when the coupling body is moved by the adjustment rod so as to move the support shaft, the movement is guided by the guide rod and the second holding member. Accordingly, the driven rotating body can be adjusted smoothly. In other words, the tension of the endless rotating body can be adjusted smoothly.

In the present invention, it is preferable that a conveying surface that forms a threshing product conveying path is provided inside the conveying case, the conveying surface is divided into a conveying-end-side conveying surface portion having a portion that extends along a periphery of the driven rotating body, and a conveying surface portion that is a portion other than the conveying-end-side conveying surface portion, and the conveying-end-side conveying surface portion is configured to move along with the support arms.

According to this configuration, when the driven rotating body is moved and adjusted, the support arms move together with the support shaft of the driven rotating body, and the conveying-end-side conveying surface portion follows the movement of the support arms. Accordingly, the conveying path extends up to the position where the driven rotating body is located regardless of movement of the driven rotating body.

In other words, when the tension of the endless rotating body is adjusted, the conveying path can reliably extend up to the driven rotating body inside the conveying case without requiring a special operation for forming the conveying path. Accordingly, the threshing product can be conveyed without obstruction.

[3] The following is a means for solving the issues corresponding to Issue [3].

A harvester according to the present invention includes: a harvesting unit; a threshing device that is provided rearward of the harvesting unit and is configured to thresh a harvest product harvested by the harvesting unit; a conveying device that extends rearward and upward from the harvesting unit and is configured to convey a whole culm of the harvest product from the harvesting unit to the threshing device; a driver portion provided at a position that is adjacent to a front of the threshing device and above the conveying device; and a transmission apparatus that is provided at a position that is adjacent to a front of the threshing device and below the conveying device, and is configured to adapt motive power from a drive source and transmit the adapted motive power to a traveling device, wherein a manual transmission operation tool configured to instruct a change in a transmission state of the transmission apparatus is provided in the driver portion, and a transmission mechanism by which operation force applied to the transmission operation tool is transmitted to the transmission apparatus extends in a horizontal direction between the transmission apparatus and the threshing device.

According to this feature configuration, the transmission mechanism extends in the horizontal direction between the transmission apparatus and the threshing device. For this reason, the transmission mechanism can be configured such that the portion that frequently requires maintenance is located outward in the body left-right direction, thus making it possible to improve the ease-of-maintenance of the transmission mechanism.

In the present invention, it is preferable that the transmission mechanism includes a rod that extends in the horizontal direction between the transmission apparatus and the threshing device, and an operation wire that connects the rod and the transmission operation tool to each other, a first end portion that is one end portion of the rod is connected to the transmission apparatus, a second end portion that is another end portion of the rod is connected to a third end portion that is one end portion of the operation wire, a fourth end portion that is another end portion of the operation wire is connected to the transmission operation tool, and a connection portion where the second end portion and the third end portion are connected is located outward of the conveying device in a body left-right direction.

According to this configuration, the transmission mechanism includes the rod and the operation wire, thus making it possible to reliably perform operations with the rod, and the operation wire makes it possible to ensure freedom with respect to arrangement. Also, because the connection between the rod and the operation wire realizes reliable operation of the transmission mechanism, it is preferable that maintenance is frequently performed on the connection. According to this configuration, the connection between the second end portion and the third end portion, that is to say the connection between the rod and the operation wire, is located outward of the conveying device in the body left-right direction. For this reason, maintenance can be easily performed on the connection, and it is possible to improve the ease-of-maintenance of the transmission mechanism.

In the present invention, it is preferable that the transmission mechanism includes a first arm that is arranged between the transmission apparatus and the first end portion and can undergo swing displacement, and a second arm that is arranged between the second end portion and the third end portion and can undergo swing displacement, and the operation wire extends upward beyond a connection portion where the operation wire and the second arm are connected.

According to this configuration, the first arm and the second arm that can undergo swing displacement are provided, and therefore the connection between the transmission apparatus and the rod and the connection between the rod and the operation wire can be realized with a simple structure. Also, the operation wire extends upward beyond the connection portion connected to the second arm. This configuration is preferable because it is therefore possible to reduce the amount of bending of the operation wire that extends from the second arm to the driver portion.

In the present invention, it is preferable that the harvester further includes: a drive shaft case that extends in the horizontal direction from the transmission apparatus and supports a drive shaft configured to transmit motive power to the traveling device; and a support frame that extends along a front-rear direction above the drive shaft case and supports the drive shaft case, wherein the support frame includes a support portion that supports an outer casing of the operation wire, and the support portion is provided on a side surface of the support frame that is on a side on which the transmission apparatus is located.

According to this configuration, the outer casing of the operation wire is supported by the strong support frame that supports the drive shaft case. For this reason, the operation wire is reliably fixed, and the transmission mechanism operates reliably. As a result, it is possible to improve the reliability of the transmission mechanism.

In the present invention, it is preferable that the harvester further includes: a gear switch type of gear transmission apparatus that is arranged between the transmission apparatus and the traveling device and is configured to adapt motive power from the transmission apparatus and transmit the adapted motive power to the traveling device; and a manual gear transmission operation tool that is provided in the driver portion and is configured to instruct a change in a transmission state of the gear transmission apparatus, wherein an operation mechanism configured to operate the gear transmission apparatus in accordance with an operation performed on the gear transmission operation tool extends in the horizontal direction between the gear transmission apparatus and the threshing device.

According to this configuration, the operation mechanism extends in the horizontal direction between the gear transmission apparatus and the threshing device. Accordingly, the operation mechanism can be configured such that the portion that frequently requires maintenance is located outward in the body left-right direction. As a result, it is possible to improve the ease-of-maintenance of the operation mechanism.

In the present invention, it is preferable that the harvester further includes: a connecting frame that connects the threshing device and the gear transmission apparatus to each other, wherein the operation mechanism includes an actuator configured to operate in accordance with an operation performed on the gear transmission operation tool, and a link mechanism configured to transmit movement of the actuator to the gear transmission apparatus, and the actuator is supported by the connecting frame.

According to this configuration, the actuator is supported by the strong connecting frame that connects the threshing device and the gear transmission apparatus to each other. For this reason, the actuator is reliably fixed, and the operation mechanism operates reliably. As a result, it is possible to improve the reliability of the operation mechanism.

BRIEF DESCRIPTION OF THE DRAWINGS

FIG. 25 is a cross-sectional view of a configuration of a hydrostatic stepless transmission and the like.

DETAILED DESCRIPTION OF THE INVENTION

First Embodiment

Hereinafter, a first embodiment, which is an example of the present invention, will be described with reference to FIGS. 1 to 4. Note that in the following description, with respect to the body of a combine, the direction of an arrow F shown in FIG. 1 is "body forward", the direction of an arrow B is "body rearward", the direction of an arrow U is "body upward", the direction of an arrow D is "body downward", the direction toward the front side of the paper is "body leftward", and the direction of the back side of the paper is "body rightward".

Figure 1:
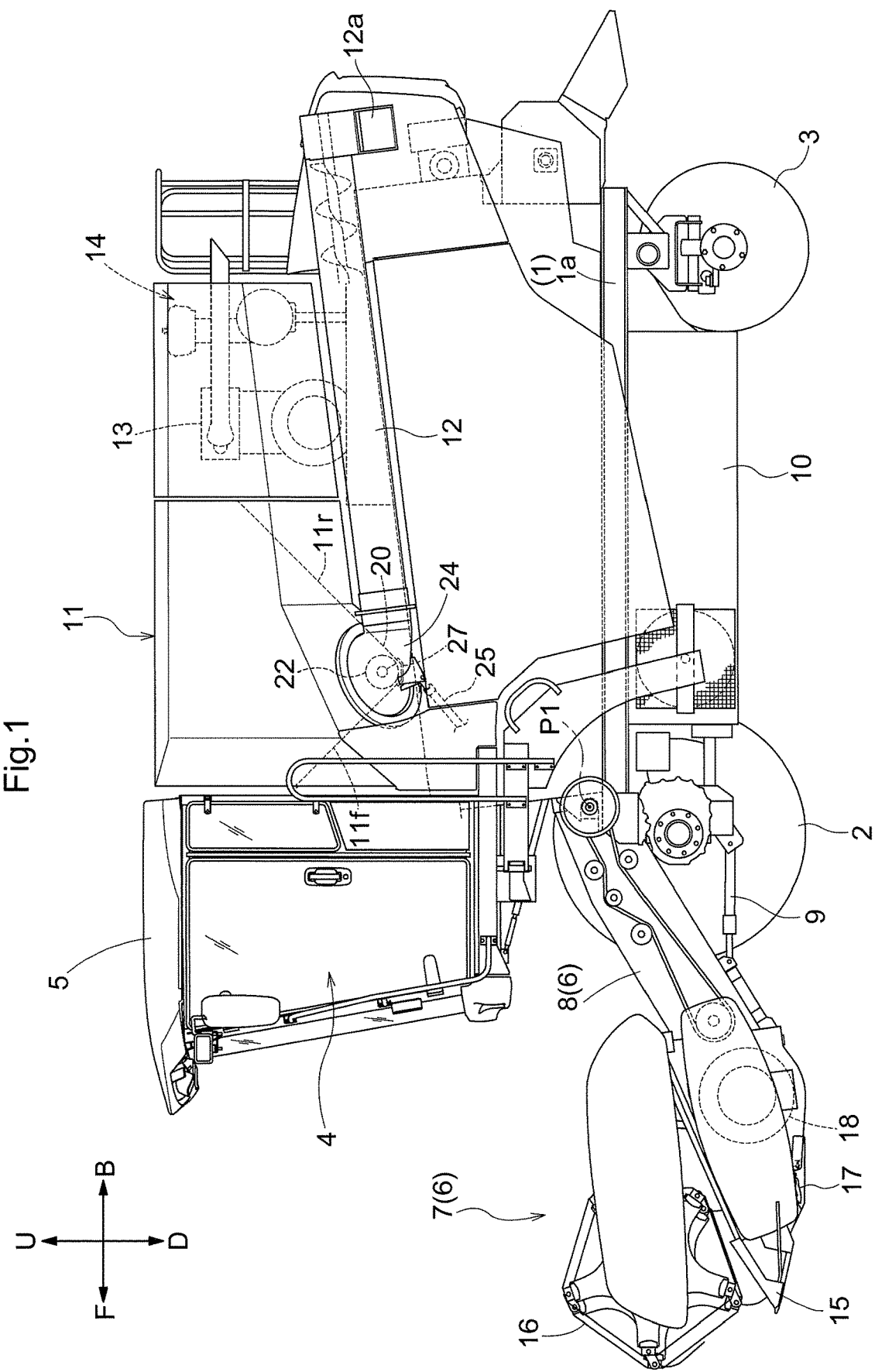
FIG. 1 is a diagram showing a first embodiment (hereinafter, the same applies up to FIG. 4), and is a left side view of the entirety of a combine.

Overall Configuration of Combine:

The combine shown in FIG. 1 includes a body frame 1, a pair of left and right front wheels 2 that are drivable and attached to a front portion of the body frame 1, and a pair of left and right rear wheels 3 that are steerable and attached to a rear portion of the body frame 1. The body frame 1 is provided with a pair of left and right main frames 1a that extend in the body front-rear direction. A riding type of driver portion 4 is formed in the front portion of the machine body. The driver portion 4 is provided with a cabin 5 that surrounds a riding space. A harvest conveying device 6 is coupled to the front portion of the body frame 1. The harvest conveying device 6 is provided with a harvesting unit 7, which is provided in front the machine body and is for reaping and harvesting the grain culm of a crop such as paddy rice, wheat, or rapeseed located in front the machine body during traveling operation, and a feeder 8 for conveying the reaped grain culm that was harvested by the harvesting unit 7. The front portion of the feeder 8 is coupled to the rear portion of the harvesting unit 7. The feeder 8 is coupled to the body frame 1 so as ascend and descend by swinging about a coupling axis P1 that extends in the body left-right direction. The harvesting unit 7 is raised and lowered between a lowered operation state and a raised non-operation state due to the feeder 8 being swing up and down by the extension/retraction of a hydraulic elevating cylinder 9 that is coupled to the feeder 8. Also, a threshing device 10 is provided in the rear portion of the machine body. The threshing device 10 receives the reaped grain culm conveyed by the feeder 8 and threshes the reaped grain culm, and sorts the threshed product. A threshing tank 11 is provided above the front portion of the threshing device 10. The threshing tank 11 collects and stores the separated grains that were obtained by the threshing device 10 and conveyed by a supply/convey device (not shown). A threshing discharge device 12 is connected to a left side portion of the lower portion of the threshing tank 11. The threshing discharge device 12 discharges the stored grain. A motor power portion 14 that has an engine 13 is formed above the rear portion of the threshing device 10.

Configuration of Harvesting Unit:

As shown in FIG. 1, dividers 15 for separating unreaped grain culm into harvest-target grain culm and non-harvest-target grain culm are provided at the left and right end portions of the front end portion of the harvesting unit 7. A rotary reel 16 for raking in the harvest-target grain culm with the grain tip facing rearward is provided above the front portion of the harvesting unit 7. A clipper type of reaping device 17 for cutting the stalk base of the raked-in grain culm is provided rearward of the dividers 15. An auger 18 for gathering the reaped grain culm toward the front side of the feeder 8 and supplying the entirety of the gathered reaped grain culm, from the base stalk to the grain tip, to the feeder 8 is provided rearward of the reaping device 17.

Figure 2:
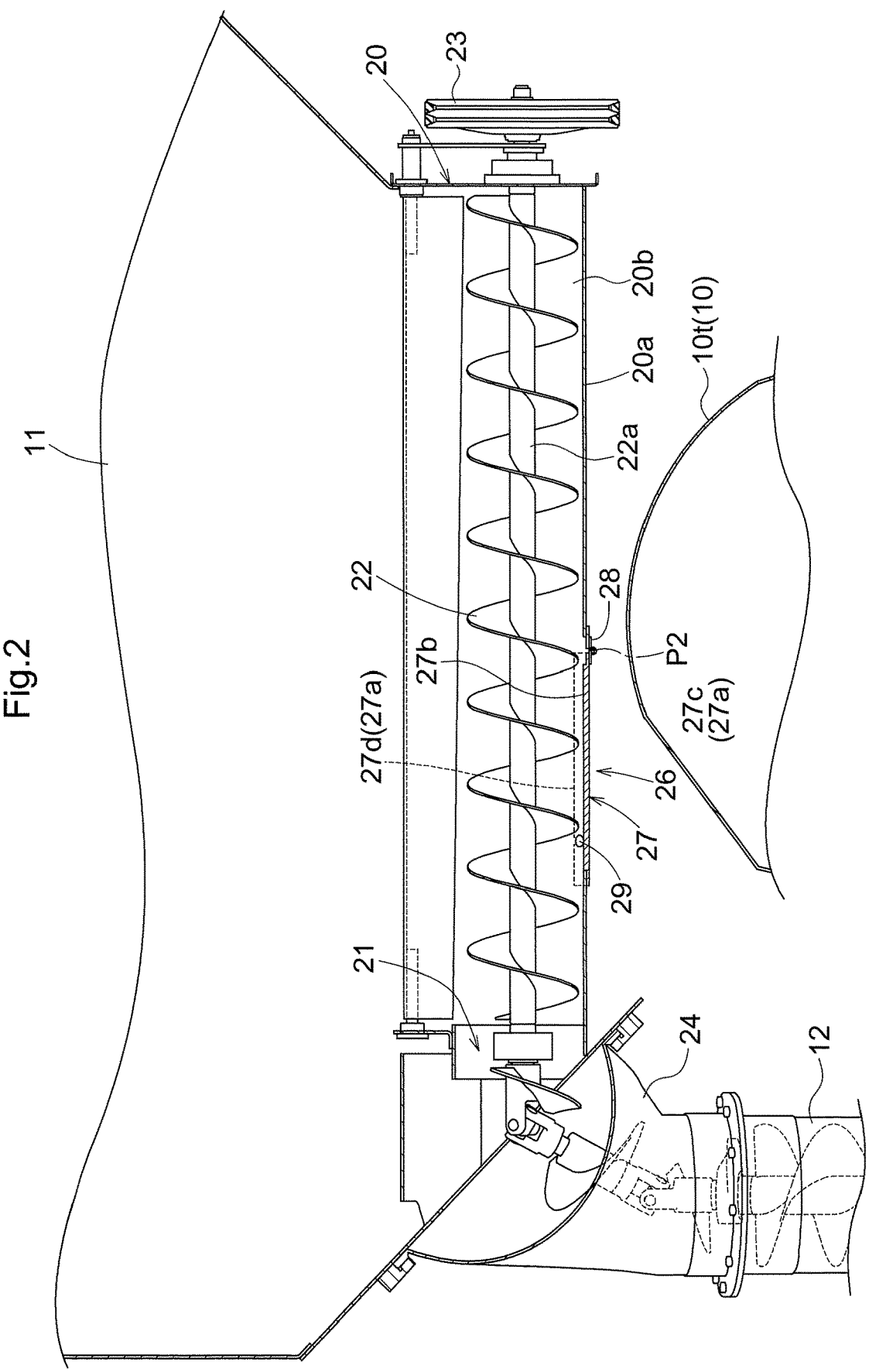
FIG. 2 is a longitudinal sectional rear view of a threshing portion tank.
Figure 3:
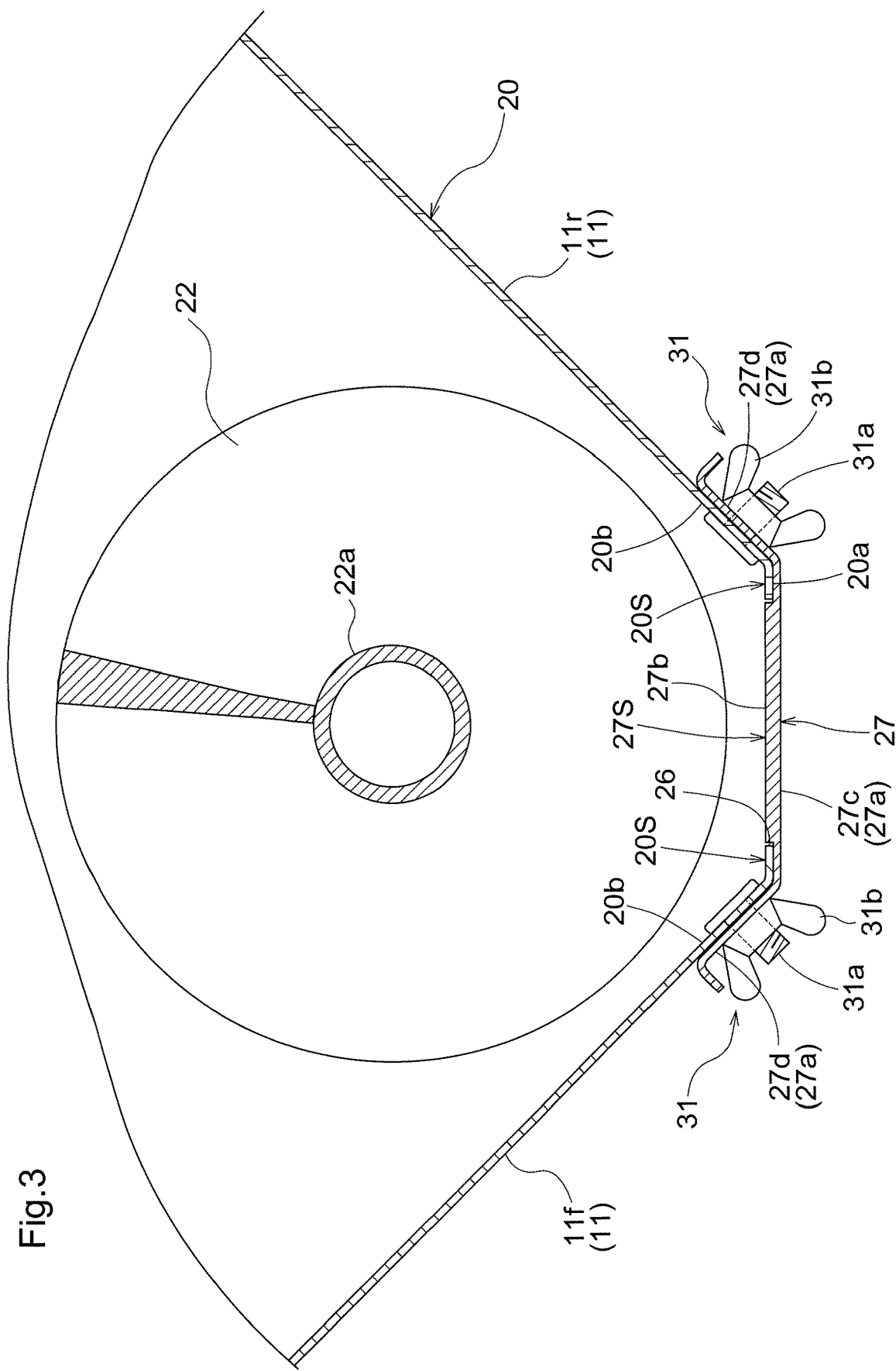
FIG. 3 is a longitudinal sectional side view of a threshing tank.

Configurations of Threshing Tank and Threshing Discharge Device:

As shown in FIGS. 1 and 3, a front wall portion 11f of the threshing tank 11 is inclined such that the lower portion extends rearward as it extends downward. Also, a rear wall portion 11r of the threshing tank 11 is inclined such that the lower portion extends forward as it extends downward. Accordingly, a lower tapered portion 20 that extends over the full width of the bottom portion of the threshing tank 11 is formed at the bottom portion. As shown in FIGS. 2 and 3, the lower tapered portion 20 is provided with a bottom section 20a that is in a horizontal orientation, a front side plate portion 20b that rises up from the front end portion of the bottom section 20a, and a rear side plate portion 20b that rises up from the rear end portion of the bottom section 20a. As shown in FIG. 2, a discharge opening 21 is formed in the end portion of the lower tapered portion 20 that is at the left side of the threshing tank. As shown in FIGS. 2 and 3, a bottom screw 22 is rotatably provided inside the lower tapered portion 20. A drive pulley 23 is non-relatively-rotatably supported by a screw shaft 22a of the bottom screw 22 outside the lower tapered portion 20 at the right side of the threshing tank.

As shown in FIGS. 1 and 2, a connection case 24 is provided at the left end portion of the bottom portion of the threshing tank 11. The threshing discharge device 12 extends from the connection case 24. The threshing discharge device 12 and the bottom screw 22 are connected via the connection case 24. The threshing discharge device 12 and the bottom screw 22 are interlockingly joined inside the connection case 24, and motive power can be transmitted from the bottom screw 22 to the threshing discharge device 12.

Specifically, the threshing discharge device 12 is constituted by a screw conveyor that extends from the connection case 24. A conveyor cylinder of the screw conveyor is in communication with the discharge opening 21 via the connection case 24. Inside the connection case 24, a screw shaft of the screw conveyor and the screw shaft 22a of the bottom screw 22 are coupled so that motive power is transmitted from the bottom screw 22 to the screw conveyor.

The connection case 24 is rotatably supported by the threshing tank 11. As shown in FIG. 1, a hydraulic cylinder 25 is coupled to the connection case 24. The connection case 24 can rotate due to extension and retraction of the hydraulic cylinder 25.

The connection case 24 is rotated by the hydraulic cylinder 25 in order to discharge grain from the threshing tank 11. Accordingly, the threshing discharge device 12 is changed from a stowed state of extending along a lateral portion of the machine body to an in-use state of protruding laterally outward from the machine body.

When a power transmission system, which is for transmitting motive power from the engine 13 to the drive pulley 23, is switched to a power transmission on state, the drive pulley 23 is driven, and the bottom screw 22 is driven. Then, motive power is transmitted from the bottom screw 22 to the threshing discharge device 12, and the threshing discharge device 12 is driven. When the bottom screw 22 and the threshing discharge device 12 are driven, the bottom screw 22 discharges grain stored in the threshing tank 11 through the discharge opening 21 to the inside of the connection case 24. The grain discharged into the connection case 24 is received by the threshing discharge device 12 and conveyed by the threshing discharge device 12 so as to be discharged from a discharge opening 12a (see FIG. 1) provided in the leading end portion of the threshing discharge device 12.

Configuration of Inspection Port and Lid:

As shown in FIGS. 2 and 3, the lower tapered portion 20 is provided with an inspection port 26 that is formed in the bottom section 20a of the lower tapered portion 20 and a lid 27 for opening and closing the inspection port 26.

More specifically, the inspection port 26 is provided in a state of being biased toward the side where the threshing discharge device 12 is located relative to the central portion of the bottom section 20a in the conveying direction of the bottom screw 22. Because the inspection port 26 and the threshing discharge device 12 are located close to each other, a task such as cleaning for discharging the grain remaining in the lower tapered portion 20 through the inspection port 26, and a task such as inspecting the threshing discharge device 12 can be easily performed at the same time.

Figure 4:
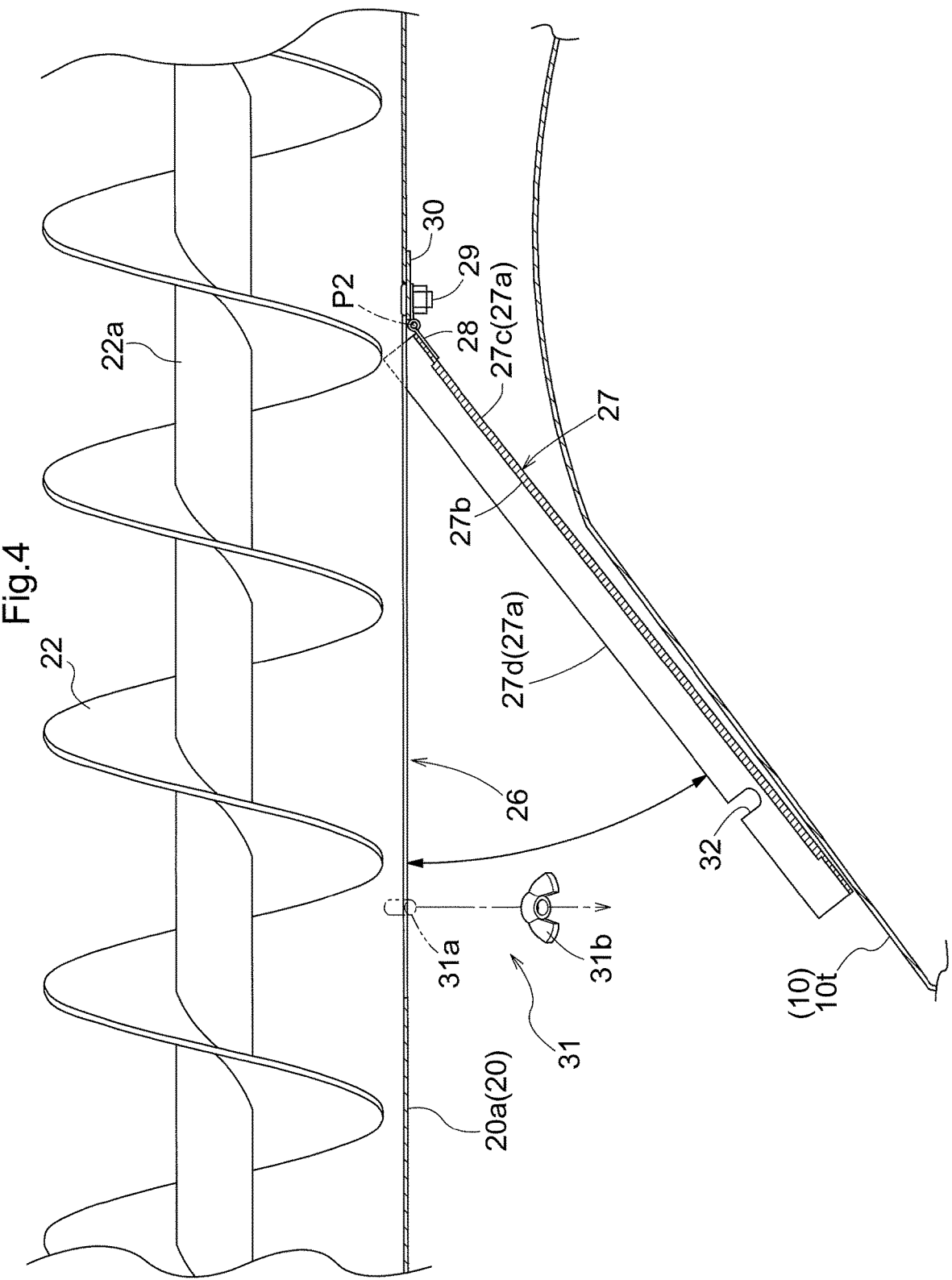
FIG. 4 is a rear view of an inspection port and a lid in an open state.

As shown in FIGS. 2 and 4, a hinge member 28 is provided so as to extend between the bottom section 20a and the end portion of the lid 27 on the upper side in the conveying direction of the bottom screw 22. The hinge member 28 and the bottom section 20a are coupled by a coupling shaft 29 that projects outward from the bottom section 20a. The coupling shaft 29 is supported by the bottom section 20a so as to not protrude inward of the bottom section 20a. Specifically, the coupling shaft 29 projects from a support portion 30 that is formed on the outer surface side of the bottom section 20a. In the present embodiment, a connecting screw is used as the coupling shaft 29. The coupling shaft 29 is not limited to being a connecting screw, and can be a coupling bar, a coupling pin, or the like. Due to the hinge member 28, the end portion of the lid 27 on the upstream side in the conveying direction of the bottom screw 22 has a pivot axis P2 that is not parallel with the screw axis of the bottom screw 22. The lid 27 is supported by the lower tapered portion 20 so as to open and close by swinging upward and downward about the axis P2. In the present embodiment, the axis P2 that is orthogonal to the screw axis in a plan view is employed as the axis P2 that is not parallel with the screw axis, but the present invention is not limited to this. The "axis that is not parallel with the screw axis" in the configuration of the present invention is a concept that includes not only an axis that is orthogonal to the screw axis in a plan view, but also an axis that slightly deviates from an angle orthogonal to the screw axis in a plan view, that is to so say an axis that is substantially orthogonal to the screw axis in a plan view.

As shown in FIGS. 3 and 4, the lid 27 is provided with an outer lid portion 27a and an inner lid portion 27b. The outer lid portion 27a is provided with a lid bottom plate portion 27c and lid side plate portions 27d that rise upward from the two lateral end portions of the lid bottom plate portion 27c. As shown in FIG. 4, the lid side plate portions 27d at the two lateral end portions are inclined so that a gap between the lid side plate portions 27d becomes wider toward the upper end side of the lid side plate portion 27d.

As shown in FIGS. 2 and 3, the outer lid portion 27a is configured such that, when the lid 27 is in the closed state of the lid 27, one of the lid side plate portions 27d extends along the outward surface of the front side plate portion 20b of the lower tapered portion 20, the other lid side plate portion 27d extends along the outward surface of the rear side plate portion 20b of the lower tapered portion 20, and the lid bottom plate portion 27c is in contact with the outward surface of the bottom section 20a around the inspection port 26.

As shown in FIGS. 2 and 3, the inner lid portion 27b is inside the inspection port 26 when the lid 27 is in the closed state. The inner lid portion 27b is configured such that when the lid 27 is in the closed state, an inward surface 27S of the lid bottom plate portion 27c is flush with an inward surface 20S of the bottom section 20a.

As shown in FIGS. 2 and 3, lock mechanisms 31 for fixing the lid 27 in the closed state are provided over a range between the free end portion of the lid 27 and the front and rear sides of the lower tapered portion 20. As shown in FIGS. 3 and 4, the front lock mechanism 31 and the rear lock mechanism 31 each have a screw shaft 31a that projects outward from the side plate portion 20b of the lower tapered portion 20, an elongated hole portion 32 formed in the lid side plate portion 27d, and a nut 31b that is fastened to the screw shaft 31a. In the present embodiment, a cutout hole portion is adopted as the elongated hole portion 32, but the present invention is not limited to this. In other words, depending on the inclination angle and the rising length of the lid side plate portion 27d, it is possible to adopt an elongated hole portion having a shape that is not open on the upper side of the lid side plate portion 27d. In the present embodiment, a wing nut is adopted as the nut 31b, but the present invention is not limited to this. For example, various nut members such as hexagon nuts and capped nuts can be adopted.

In the front and rear lock mechanisms 31, the screw shafts 31a enter the elongated hole portions 32 as the lid body 27 swings toward the closed state. Then, when the lid 27 is in the closed state, the screw shafts 31a are in a state of passing through the elongated hole portions 32. After the screw shafts 31a have passed through the elongated hole portions 32, when a worker then fastens the nuts 31b to the screw shafts 31a, the lid side plate portions 27d are fastened to the side plate portions 20b due to the fastening force of the nuts 31b and the screw shafts 31a, and the lid 27 is fixed in the closed state. Also, if the nuts 31b are unfastened from the screw shafts 31a, the fastening of the lid side plate portions 27d to the side plate portions 20b is canceled, and the lid 27 is no longer fixed in the closed state. Accordingly, the lid 27 can be changed from the closed state to the open state.

Under normal conditions, as shown in FIGS. 2 and 3, when the lid 27 is swing upward about the axis P2 toward the lower tapered portion 20 and brought into contact with the lower tapered portion 20, the lid 27 enters the closed state, and the inspection port 26 becomes closed. When the lid 27 is in the closed state, if the nuts 31b are fastened to the front and rear screw shafts 31a, the lid 27 is fixed in the closed state by the front and rear lock mechanisms 31. The grain in the threshing tank 11 can be then be discharged by the bottom screw 22 and the threshing discharge device 12. Here, the inward surface 27S of the lid bottom plate portion 27c and the inward surface 20S of the bottom section 20a are flush due to the inner lid portion 27b. Accordingly, grain can be smoothly discharged without entering the inspection port 26. Also, the lid bottom plate portion 27c is in contact with the outward surface of the bottom section 20a around the inspection port 26, and the pair of lid side plate portions 27d extend along the front and rear side plate portions 20b. The inspection port 26 is therefore tightly closed. As a result, grain can be discharged while being prevented from leaking out through the inspection port 26.

If grain remains in the lower tapered portion 20, as shown in FIG. 4, the worker can unfasten the nuts 31b from the front and rear screw shafts 31a, and swing the lid 27 downward about the axis P2 away from the lower tapered portion 20. Accordingly, the free end side of the lid 27 moves downward and away from the lower tapered portion 20, and the lid 27 enters the open state. As a result, the inspection port 26 is opened. Grain in the lower tapered portion 20 can thus be discharged through the inspection port 26. Also, a ceiling plate 10t of the threshing device 10 is arc-shaped, and therefore a free space is formed between the threshing tank 11 and the ceiling plate 10t. Due to the free end side of the lid 27 entering the free space, the free end side of the lid 27 can be lowered a large amount. Grain can thus be discharged easily. Also, the lid 27 can be opened by swinging about the axis P2 that is not parallel with the screw axis of the bottom screw 22. Accordingly, the lid 27 can be used as a guide member for guiding the grain that falls out through the inspection port 26. Also, the grain flowing down along the lid 27 is prevented from falling off the lid 27 by the lid side plate portions 27d. Grain can thus be discharged easily. Furthermore, the lid 27 can open by swinging about the axis P2 that is located at the end portion of the lid 27 on the upstream side in the conveying direction of the bottom screw 22. Accordingly, when the bottom screw 22 is rotated and grain is pushed out through the inspection port 26 by the bottom screw 22, the grain is pushed out in a direction along the inclined direction of the open lid 27. As a result, grain is discharged smoothly.

Variations of First Embodiment

The following describes modifications of the embodiment described above. The matter other than the matter described in the following variations is similar to the matter described above embodiment. The above embodiment and the following variations may be appropriately combined as long as no contradiction arises. The scope of the present invention is not limited to the above-described embodiment and the following variations.

(1) Although an example in which the lid 27 includes the lid side plate portions 27d is illustrated in the above embodiment, it is possible to employ a lid that is plate-shaped and does not include the lid side plate portions 27d.

(2) In the above embodiment, an example is illustrated in which the lid 27 swings about the axis P2 that is provided at the end portion of the lid 27 on the upstream side in the conveying direction of the bottom screw 22, but it is possible to employ a lid that swings about an axis that is provided at the end portion of the lid 27 on the downstream side in the conveying direction of the bottom screw 22.

(3) In the above embodiment, an example is illustrated in which the inspection port 26 is biased to the side on which the threshing discharge device 12 is located relative to the center of the bottom section 20a in the conveying direction of the bottom screw 22, but the inspection port 26 may be provided in the central portion of the bottom section 20a with respect to the conveying direction of the bottom screw 22. Also, the inspection portion 26 may be biased to the side on which the threshing discharge device 12 is not located relative to the center of the bottom section 20a in the conveying direction of the bottom screw 22.

(4) Although an example in which the lid 27 is provided with the inner lid portion 27b is illustrated in the above embodiment, the inner lid portion 27b may be omitted.

Second Embodiment

Hereinafter, a second embodiment, which is an example of the present invention, will be described with reference to FIGS. 5 to 18. Note that in the following description, with respect to the body of a combine, the directions of arrows F and B shown in FIGS. 5, 6, and 7 are respectively "body forward" and "body rearward", the directions of arrows U and D shown in FIGS. 5 and 6 are respectively "body upward" and "body downward", and the directions of arrows L and R shown in FIG. 7 are respectively "body leftward" and "body rightward".

Figure 5:
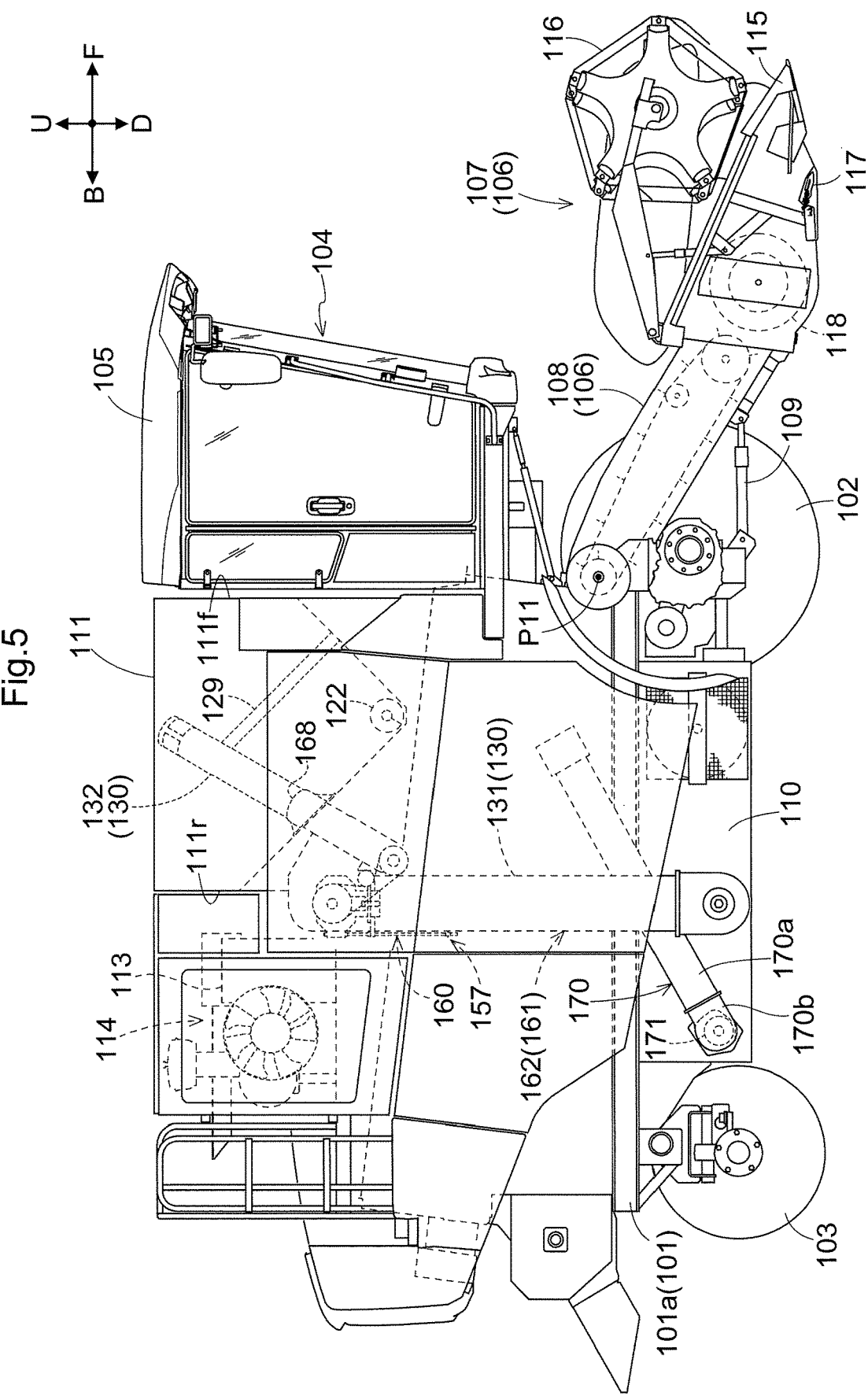
FIG. 5 is a diagram showing a second embodiment (hereinafter, the same applies up to FIG. 18), and is a right side view of the entirety of a combine.
Figure 6:
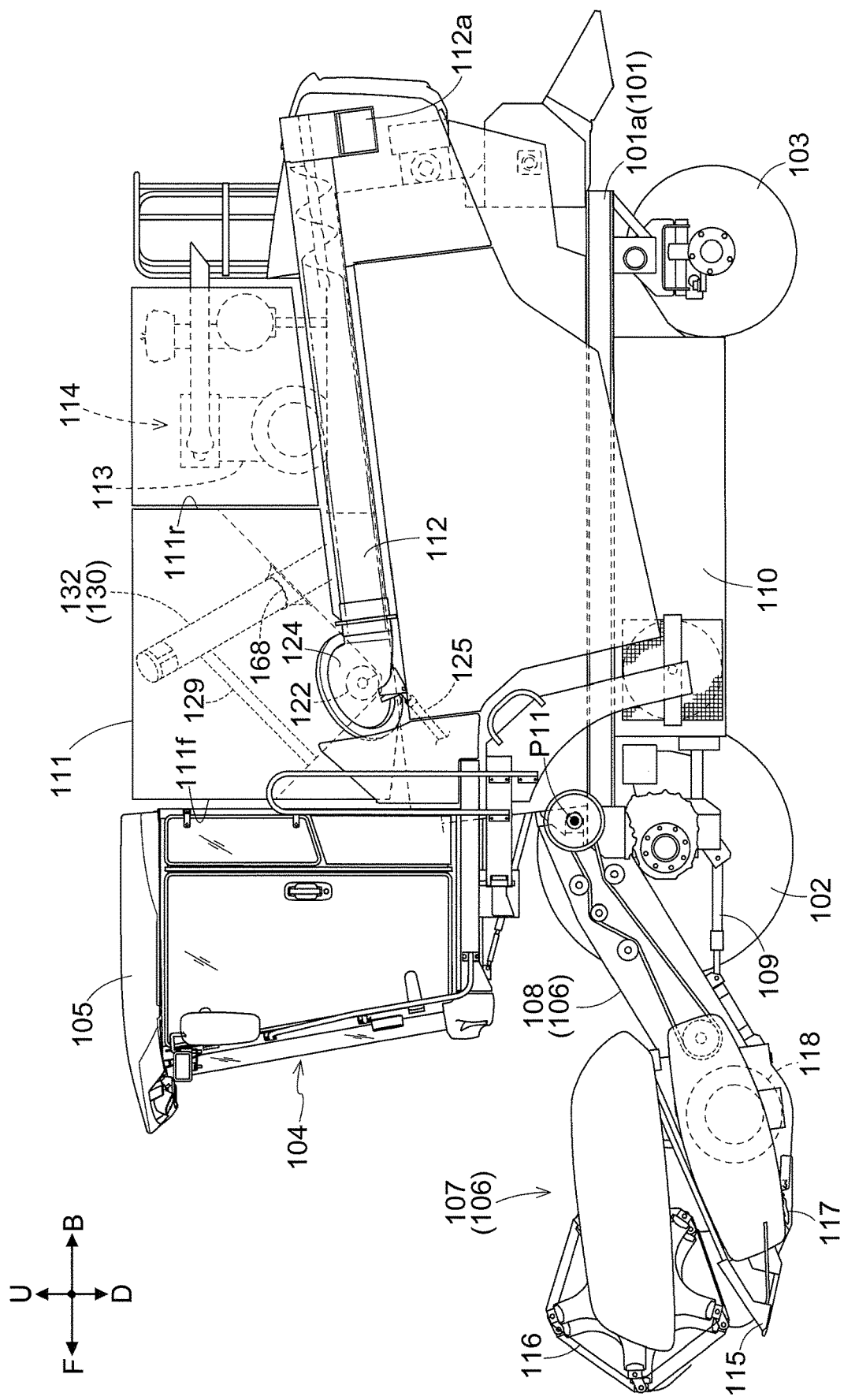
FIG. 6 is a left side view of the entirety of the combine.
Figure 7:
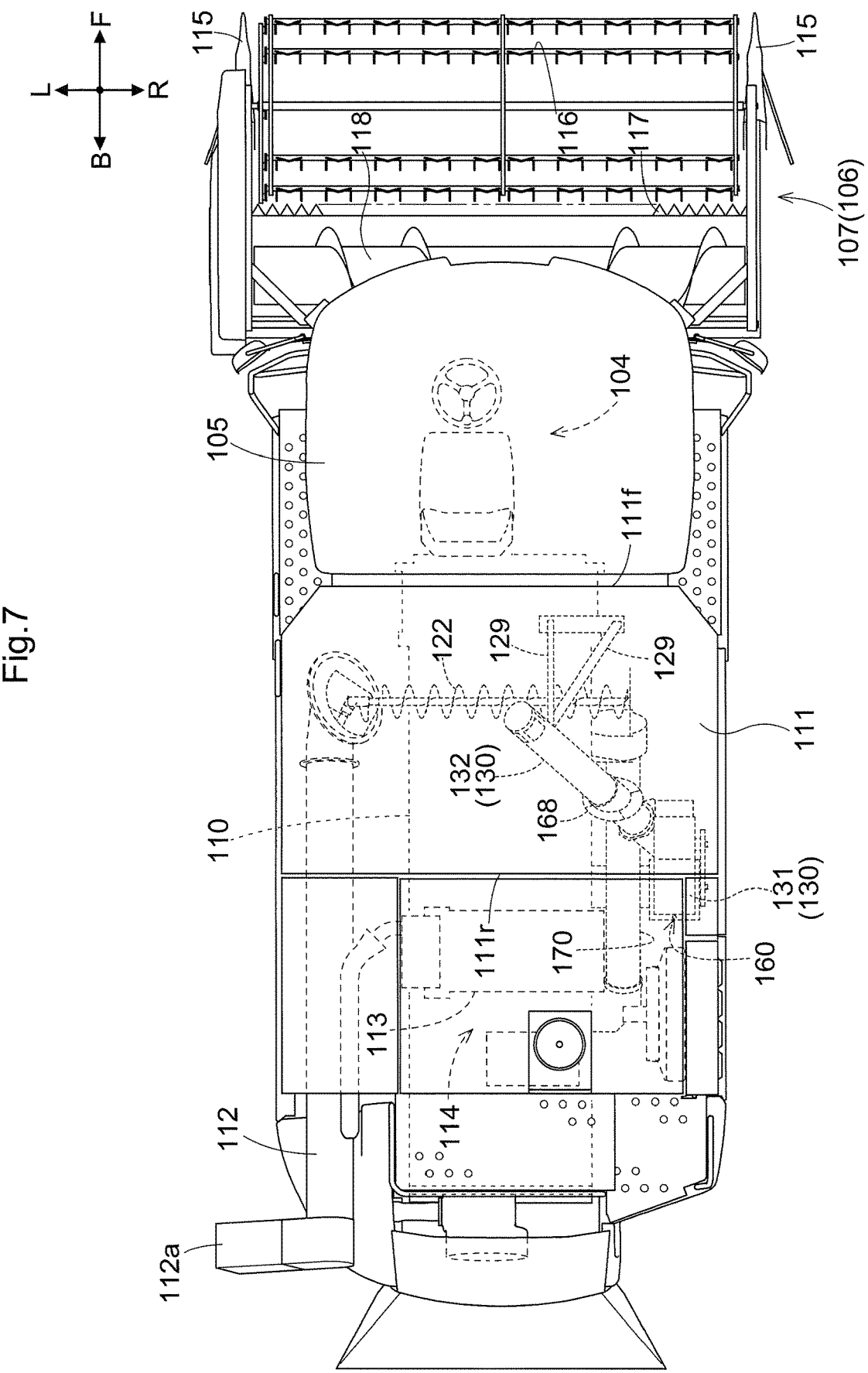
FIG. 7 is a plan view of the entirety of the combine.

Overall Configuration of Combine:

The combine shown in FIGS. 5, 6, and 7 includes a body frame 101, a pair of left and right front wheels 102 that are drivable and attached to a front portion of the body frame 101, and a pair of left and right rear wheels 103 that are steerable and attached to a rear portion of the body frame 101. The body frame 101 is provided with a pair of left and right main frames 101a that extend in the body front-rear direction. A riding type of driver portion 104 is formed in the front portion of the machine body. The driver portion 104 is provided with a cabin 105 that surrounds a riding space. A harvest conveying device 106 is coupled to the front portion of the body frame 101. The harvest conveying device 106 is provided with a harvesting unit 107, which is provided in front the machine body and is for reaping and harvesting the grain culm of a crop such as paddy rice, wheat, or rapeseed located in front the machine body during traveling operation, and a feeder 108 for conveying the reaped grain culm that was harvested by the harvesting unit 107. The front portion of the feeder 108 is coupled to the rear portion of the harvesting unit 107. The feeder 108 is coupled to the body frame 101 so as ascend and descend by swinging about a coupling axis P11 that extends in the body left-right direction. The harvesting unit 107 is raised and lowered between a lowered operation state and a raised non-operation state due to the feeder 108 being swing up and down by the extension/retraction of a hydraulic elevating cylinder 109 that is coupled to the feeder 108. A threshing device 110 is provided in the rear portion of the machine body. The threshing device 110 receives the reaped grain culm conveyed by the feeder 108 and threshes the reaped grain culm, and performs sorting processing on the threshed product. A threshing tank 111 is provided above the front portion of the threshing device 110. The threshing tank 111 collects and stores the separated grains that were obtained by the threshing device 110 and conveyed by a supply/convey device 130. A threshing discharge device 112 for discharging the stored grain is connected to a left side portion of the lower portion of the threshing tank 111. A motor power portion 114 that has an engine 113 is formed above the rear portion of the threshing device 110.

Configuration of Harvesting Unit:

As shown in FIGS. 5, 6, and 7, dividers 115 for separating unreaped grain culm into harvest-target grain culm and non-harvest-target grain culm are provided at the left and right end portions of the front end portion of the harvesting unit 107. A rotary reel 116 for raking in the harvest-target grain culm with the grain tip facing rearward is provided above the front portion of the harvesting unit 107. A clipper type of reaping device 117 for cutting the stalk base of the raked-in grain culm is provided rearward of the dividers 115. An auger 118 for gathering the reaped grain culm toward the front side of the feeder 108 and supplying the entirety of the gathered reaped grain culm, from the base stalk to the grain tip, to the feeder 108 is provided rearward of the reaping device 117.

Figure 8:
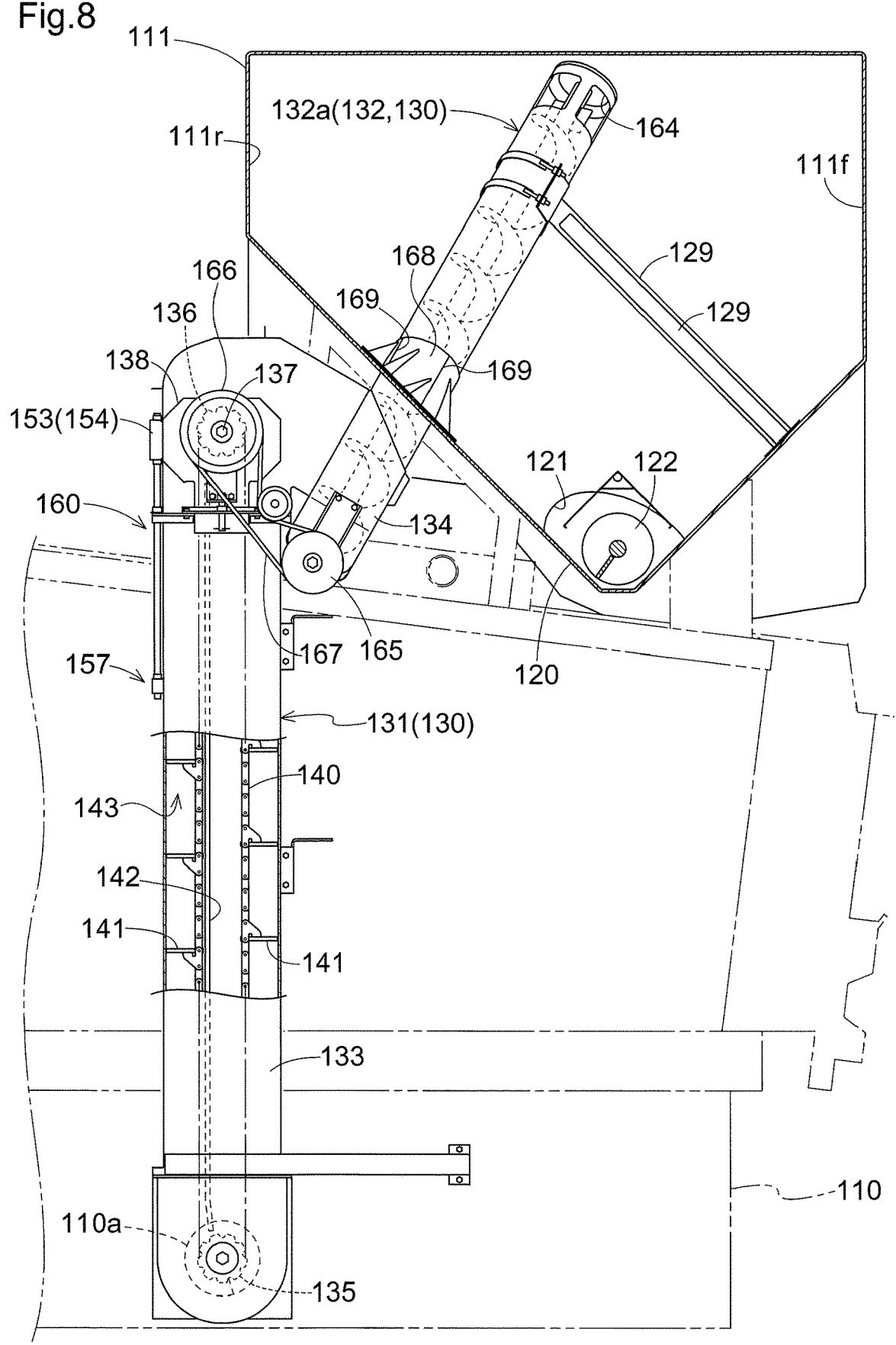
FIG. 8 is a left side view of a supply/convey device.

Configuration of Supply/Convey Device:

As shown in FIGS. 5, 7 and 8, the supply/convey device 130 includes a slat conveyor 131 and a screw conveyor 132. The slat conveyor 131 is provided extending along the body up-down direction between a right-side outer portion of the lower portion of the threshing device 110 and the rear portion of the threshing tank 111. Further, the screw conveyor 132 is provided extending between the upper portion of the slat conveyor 131 and the interior of the threshing tank 111.

As shown in FIG. 8, the slat conveyor 131 is provided with a conveying case 133 that extends from the right-side outer portion of the lower portion of the threshing device 110 to the rear portion of the lower portion of the threshing tank 111. The threshing device 110 is also provided with a first screw conveyor 110a. The lower end portion of the conveying case 133 is connected to the conveying end portion of the first screw conveyor 110a. Separated grains, which are a first product obtained in the sorting portion of the threshing device 110, are supplied by the first screw conveyor 110a to the interior of the lower end portion of the conveying case 133. The upper end portion of the conveying case 133 is connected to the conveying start portion of the screw conveyor 132 via a connection case 134.

As shown in FIG. 8, a drive sprocket 135 serving as a drive rotating body is provided inside the lower end portion of the conveying case 133. One end side of the screw shaft of the first screw conveyor 110a extends into the conveying case 133. The drive sprocket 135 is non-relatively-rotatably supported by the extending portion of the screw shaft. The drive sprocket 135 is rotatably supported by the conveying case 133 via the screw shaft of the first screw conveyor 110a. The drive sprocket 135 is driven by motive power from the first screw conveyor 110a.

Figure 9:
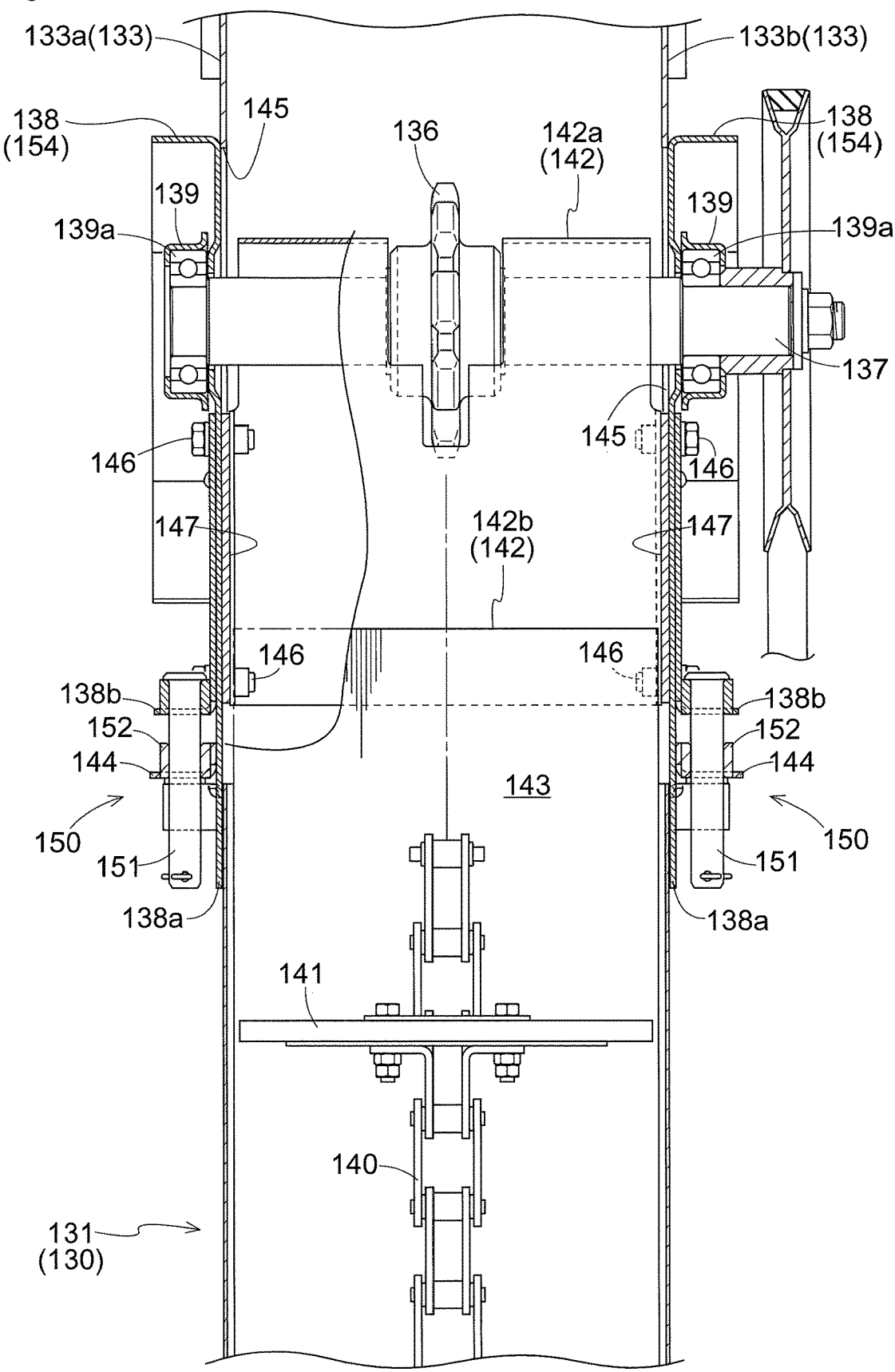
FIG. 9 is a longitudinal sectional front view of an upper portion of a slat conveyor.

As shown in FIGS. 8 and 9, a driven sprocket 136 serving as a driven rotating body is provided inside the upper end portion of the conveying case 133. The driven sprocket 136 is non-relatively-rotatably to a support shaft 137. The left end portion of the support shaft 137 is rotatably supported by a left support arm 138 via bearings 139a and a bearing case 139. The left support arm 138 is provided laterally outward of a left side wall 133a of the conveying case 133. The right end portion of the support shaft 137 is rotatably supported by a right support arm 138 via bearings 139a and a bearing case 139. The right support arm 138 is provided laterally outward of a right side wall 133b of the conveying case 133. The driven sprocket 136 is supported by the conveying case 133 via the support shaft 137, the left and right bearings 139a, the left and right bearing cases 139, and the left and right support arms 138.

Figure 10:
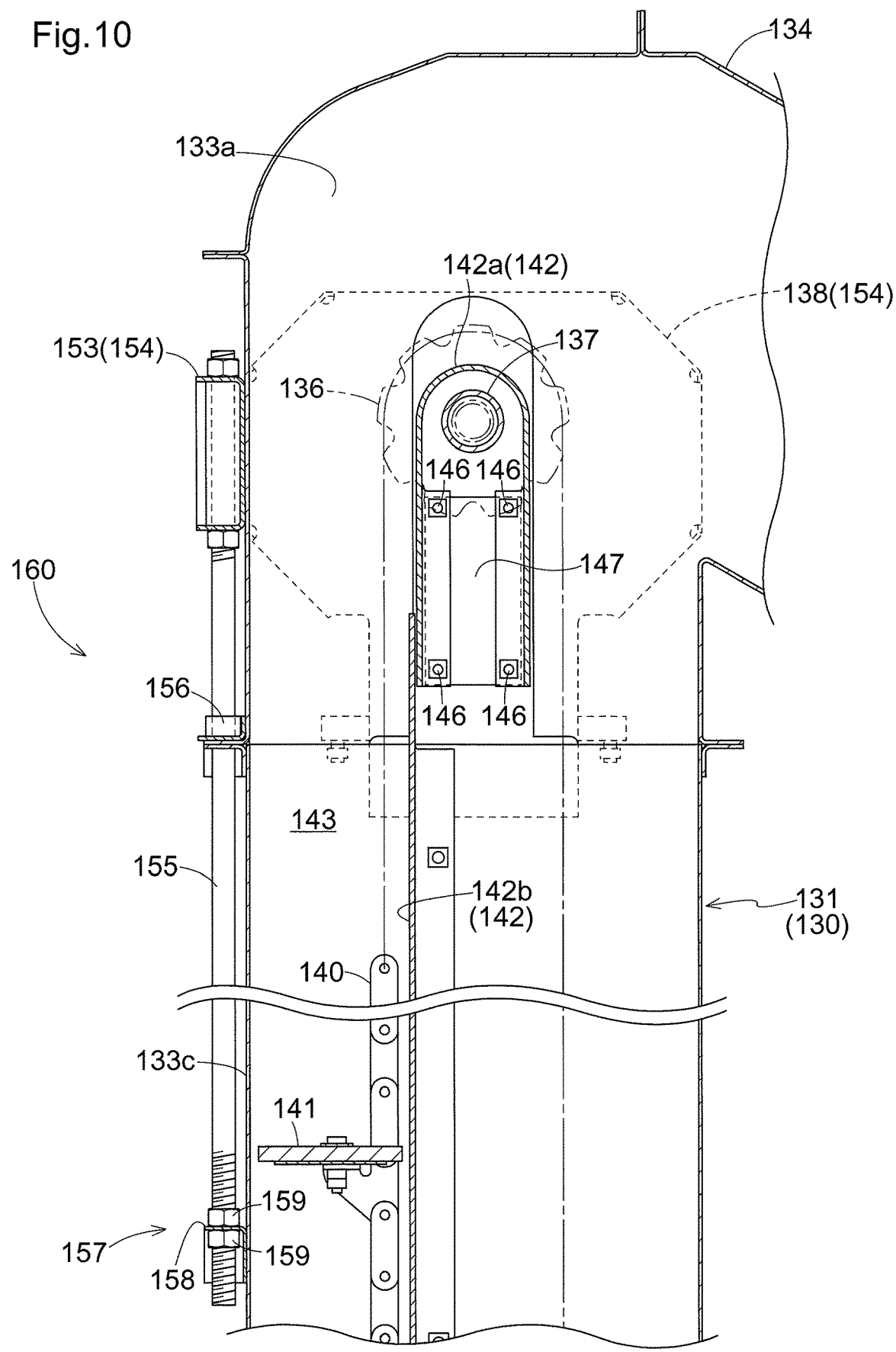
FIG. 10 is a longitudinal sectional right side view of the upper portion of the slat conveyor.

As shown in FIGS. 8, 9 and 10, an endless roller chain 140 serving as an endless rotating body is wound around the drive sprocket 135 and the driven sprocket 136. Conveying bodies (slats) 41 are provided at multiple locations along the lengthwise direction of the endless roller chain 140. A conveying surface 142 is provided extending between the outer circumferential portion of the drive sprocket 135 and the outer circumferential portion of the driven sprocket 136. A conveying path 143 is formed by the conveying surface 142 and the conveying case 133. The conveying portions of the endless roller chain 140 move upward along the conveying path 143. The conveying path 143 can thus lift grain with the conveying bodies 141. The conveying surface 142 is divided into a conveying-end-side conveying surface portion 142a having a portion that extends along the outer circumferential surface of the driven sprocket 136, and a conveying surface portion 142b that is the portion other than the conveying-end-side conveying surface portion 142a.

In the slat conveyor 131, separated grains, which are the first product obtained by sorting in the threshing device 110, are supplied by the first screw conveyor 110a into the lower end portion of the conveying case 133. The drive sprocket 135 is driven by motive power from the first screw conveyor 110a. The endless roller chain 140 is driven by the drive sprocket 135. Accordingly, the conveying bodies 141 are moved upward along the conveying path 143 by the endless roller chain 140. The grain supplied to the interior of the conveying case 133 is lifted along the conveying path 143 by the conveying bodies 141, and at the end portion of the conveying path 143, is supplied to the screw conveyor 132 via the connection case 134.

Figure 11:
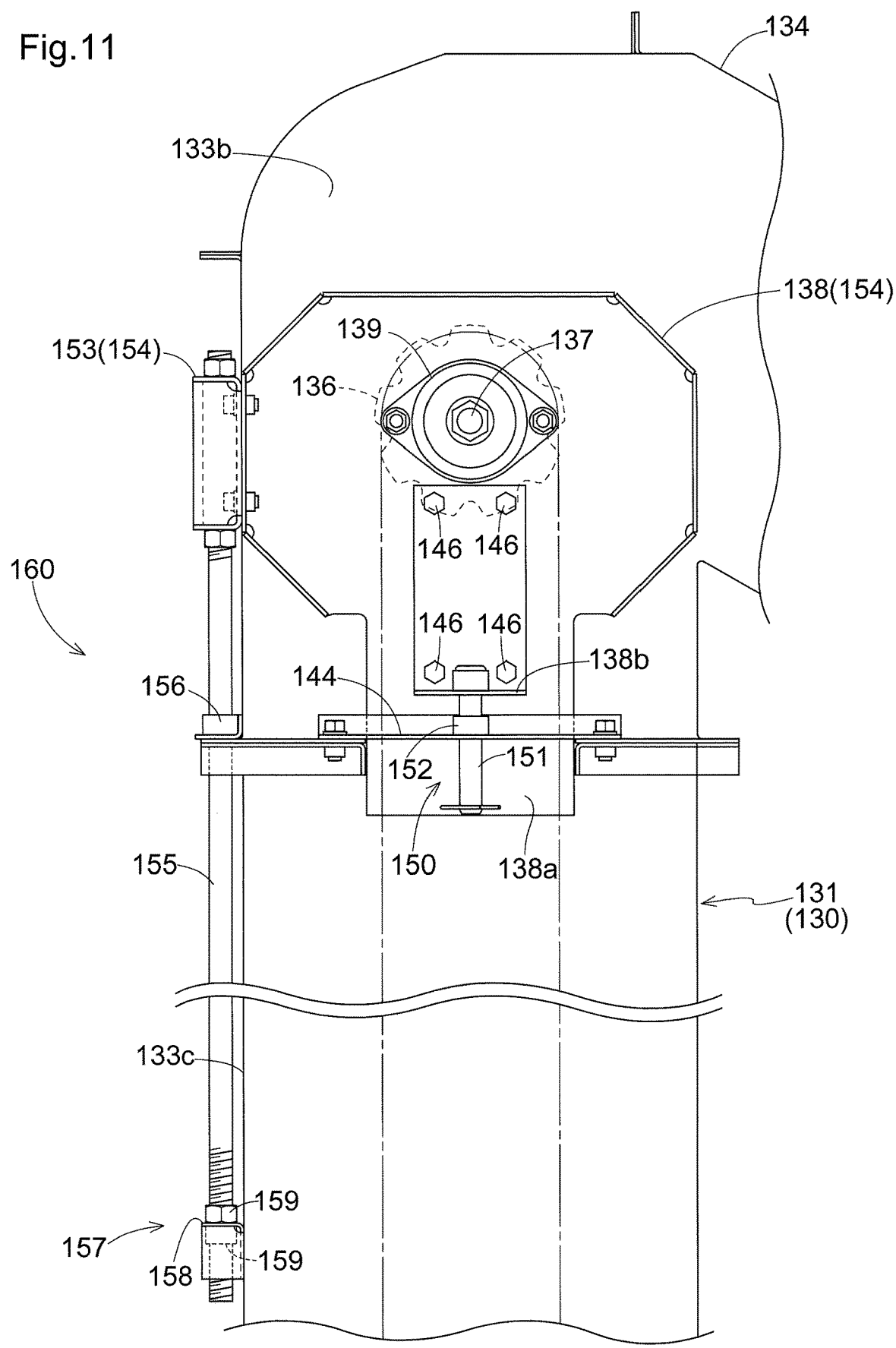
FIG. 11 is a right side view of a position adjustment mechanism and a positioning mechanism.

Configuration of Position Adjustment Mechanism:

As shown in FIGS. 9 and 11, an attachment portion 138a formed at the lower portion of the right support arm 138 is inserted between the right side wall 133b and a support portion 144 of the right side wall 133b so as to be able to slide in the up-down direction. The right support arm 138 is supported by the right side wall 133b so as to be able to slide in the up-down direction. Similarly to the right support arm 138, in the left support arm 138, an attachment portion 138a formed at the lower portion of the left support arm 138 is inserted between the left side wall 133a and a support portion 144 of the left side wall 133a so as to be able to slide in the up-down direction. The left support arm 138 is supported by the left side wall 133a so as to be able to slide in the up-down direction. As shown in FIG. 9, through-holes 145 for the passage of a support shaft 137 are formed in the left side wall 133a and the right side wall 133b. The through-holes 145 are formed as elongated holes that allow the support shaft 137 to move in a direction along the conveying direction of the slat conveyor 131. In other words, the left support arm 138 and the right support arm 138 are supported by the conveying case 133 so as to support the support shaft 137 while also allowing the support shaft 137 to slide in the conveying direction of the slat conveyor 131.

As shown in FIG. 9, the conveying-end-side conveying surface portion 142a is coupled to the left support arm 138 and the right support arm 138 by coupling bolts 146. Spacers 147 are inserted between the left support arm 138 and the conveying surface portion 142a and between the right support arm 138 and the conveying surface portion 142a. The spacers 147 have a plate thickness equivalent to the wall thickness of the left side wall 133a and the right side wall 133b. Also, the spacers 147 extend into the through-holes 145 of the left side wall 133a and the right side wall 133b. When the left support arm 138, the right support arm 138, and the support shaft 137 are moved, the conveying surface portion 142a moves along with the left and right support arms 138.

As shown in FIGS. 9 and 11, a guide mechanism 150 for guiding the movement of the left support arm 138 is provided extending between the left support arm 138 and the left side wall 133a. A guide mechanism 150 for guiding the movement of the right support arm 138 is provided extending between the right support arm 138 and the right side wall 133b. As shown in FIGS. 9 and 11, the guide mechanism 150 for the left support arm 138 and the guide mechanism 150 for the right support arm 138 each include a guide rod 151 that is provided on the support arm 138 and a second holding member 152 that is supported by the left side wall 133a or the right side wall 133b.

The guide rods 151 extend downward from support portions 138b formed on the attachment portions 138a of the support arms 138, and are supported by the support arm 138 in an orientation extending along the up-down direction. The second holding members 152 are supported by the support portions 144 so as to hold the guide rods 151 while allowing relative movement thereof. Specifically, the second holding members 152 are constituted by tube members that hold the guide rods 151 while allowing relative movement thereof.

In both the guide mechanism 150 for the left support arm 138 and the guide mechanism 150 for the right support arm 138, when the support arm 138 is moved, the guide rod 151 moves along with the support arm 138 while being held by the second holding member 152, and thus movement of the support arm 138 is guided. Accordingly, the support arms 138 move smoothly without rattling against the support portions 144.

Figure 12:
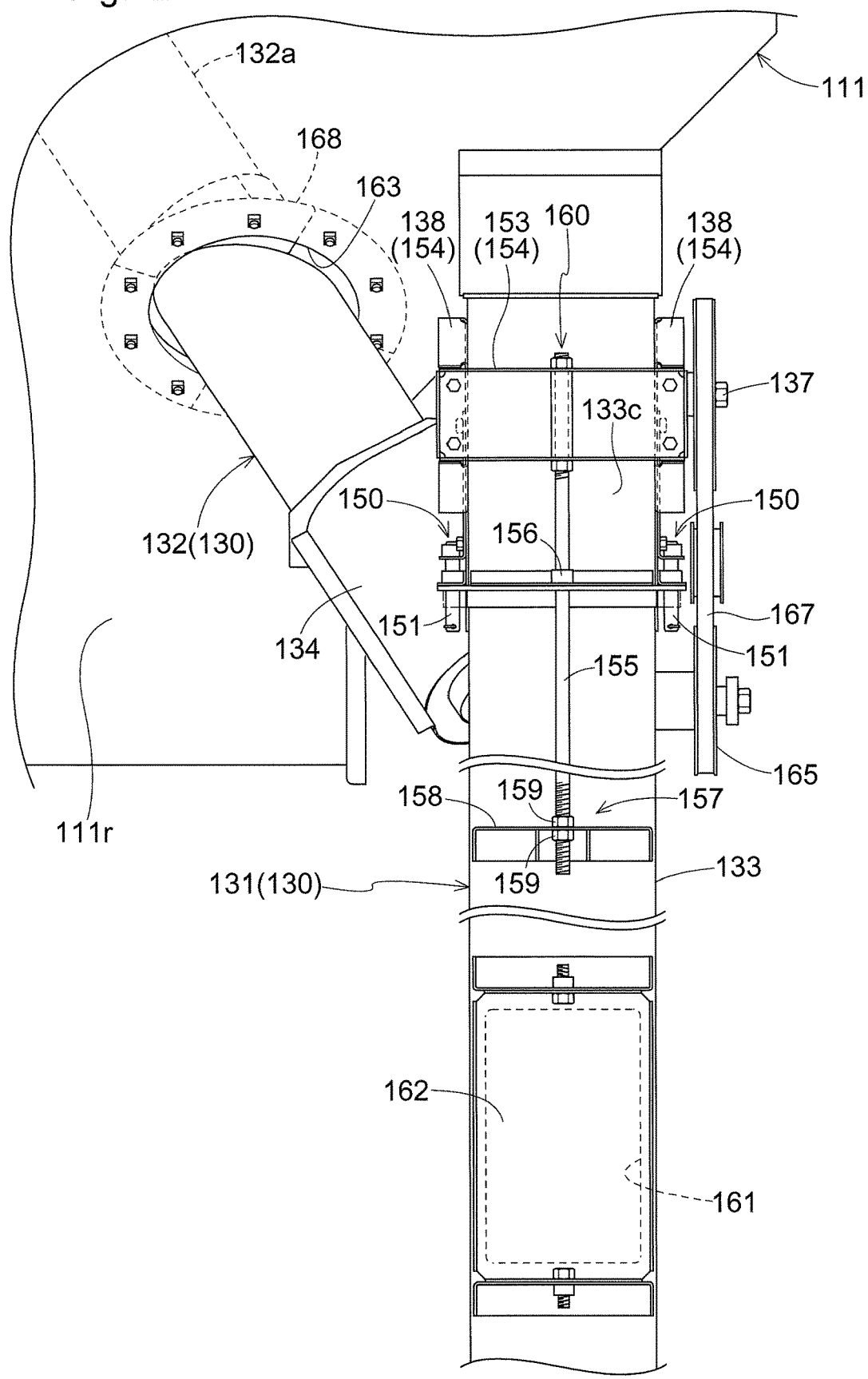
FIG. 12 is a front view of the position adjustment mechanism and the positioning mechanism.

As shown in FIGS. 10, 11 and 12, the left support arm 138 and the right support arm 138 are connected by a connecting member 153. The connecting member 153 is provided extending along the outer circumferential surface of the conveying case 133. Specifically, the connecting member 153 is provided extending along the outward surface of a front side wall 133c of the conveying case 133. The left support arm 138 and the right support arm 138 are interlockingly joined by the connecting member 153 such that the left support arm 138 and the right support arm 138 interlockingly move in the same moving direction. A coupling body 154 that connects the two ends of the support shaft 137 is constituted by the left support arm 138, the right support arm 138, and the connecting member 153.

As shown in FIGS. 10, 11, and 12, an adjustment rod 155 extends downward from the connecting member 153. The adjustment rod 155 extends along the outer circumferential surface of the conveying case 133, similarly to the connecting member 153. Specifically, the adjustment rod 155 is extends along the outward surface of the front side wall 133c of the conveying case 133. An intermediate portion of the adjustment rod 155 is held by a first holding member 156 can move relatively thereto. The first holding member 156 is supported by the conveying case 133. Specifically, the first holding member 156 is constituted by a tube member through which the adjustment rod 155 is inserted and can move relatively thereto.

As shown in FIGS. 10, 11, and 12, a positioning mechanism 157 is provided at the bottom portion of the adjustment rod 155. The positioning mechanism 157 can be used to perform adjustment for raising/lowering the adjustment rod 155 relative to the conveying case 133, and positioning the adjustment rod 155 relative to the conveying case 133.

Specifically, as shown in FIGS. 10, 11, and 12, the positioning mechanism 157 includes a positioning portion 158 and threaded members 159. The positioning portion 158 is supported by the conveying case 133 such that the adjustment rod 155 passes through the positioning portion 158 while being able to move in the up-down direction. Also, the threaded members 159 are mounted to a threaded portion of the adjustment rod 155 on the upper and lower sides of the positioning portion 158.

In the positioning mechanism 157, when the upper threaded member 159 is rotated in a taught direction, the upper threaded member 159 pushes the adjustment rod 155 upward with use of the positioning portion 158 as a reaction force point. Accordingly, the position of the adjustment rod 155 relative to the conveying case 133 is adjusted upward. Also, when the lower threaded member 159 is rotated in the slack direction, the lower threaded member 159 pushes the adjustment rod 155 downward with use of the positioning portion 158 as a reaction force point. Accordingly, the position of the adjustment rod 155 relative to the conveying case 133 is adjusted downward. Also, when the upper threaded member 159 and the lower threaded member 159 are rotated so as to clamp positioning portion 158, the adjustment rod 155 is fixed by the positioning portion 158 so as to not be able to move up or down. Accordingly, the adjustment rod 155 is positioned relative to the conveying case 133. In other words, the position of the adjustment rod 155 relative to the conveying case 133 is held at the raised/lowered position.

A position adjustment mechanism 160 is constituted by the adjustment rod 155 and the positioning mechanism 157. The position adjustment mechanism 160 enables the position of the support shaft 137 relative to the conveying case 133 to be changed in the conveying direction.

In the position adjustment mechanism 160, the adjustment rod 155 pushes the coupling body 154 upward if the positioning mechanism 157 is operated in the taught direction. Accordingly, the coupling body 154 raises the support shaft 137 relative to the conveying case 133. As a result, the endless roller chain 140 is adjusted so as to become more taught.

As shown in FIG. 12, an inspection port 161 that enables detection of the tension state of the endless roller chain 140 is formed in the conveying case 133. The inspection port 161 can be opened and closed by a removable lid 162. The inspection port 161 is formed in a portion of the conveying case 133 located below the positioning mechanism 157. When the tension of the endless roller chain 140 is adjusted by the position adjustment mechanism 160, the tension can be adjusted while detecting the tension state of the endless roller chain 140 through the inspection port 161.

A worker can detect whether or not the tension of the endless roller chain 140 is loose by inserting a hand through the inspection port 161 into the inside of the conveying case 133 and pushing and pulling the endless roller chain 140. Accordingly, it can be determined whether or not the endless roller chain 140 needs to be subjected to tension adjustment. If tension adjustment needs to be performed on the endless roller chain 140, tension adjustment can be performed on the endless roller chain 140 by the position adjustment mechanism 160.

If the tension of the endless roller chain 140 is loose, the worker rotates a threaded member 159 in the taught direction. At this time, the worker can operate the threaded member 159 while detecting the tension state of the endless roller chain 140 through the inspection port 161. When the threaded member 159 is rotated in the taught direction, the adjustment rod 155 is lifted toward the conveying case 133 by the threaded members 159. Accordingly, the connecting member 153 is pushed upward by the adjustment rod 155, and the coupling body 154 is lifted toward the conveying case 133. As a result, the two ends of the support shaft 137 are lifted by the coupling body 154. In other words, the support shaft 137 is lifted toward the conveying case 133 by the left support arm 138 and the right support arm 138. Accordingly, the driven sprocket 136 is moved downstream in the conveying direction, and the endless roller chain 140 is tightened.

When the adjustment rod 155 lifts the coupling body 154, deformation caused by reaction force is prevented by the first holding member 156 during the lifting. Furthermore, when lifting the support shaft 137, the left support arm 138 and the right support arm 138 are guided by the guide mechanism 150 during the lifting. Accordingly, the support shaft 137 is lifted smoothly, and the endless roller chain 140 is tightened smoothly. Even when the support shaft 137 is lifted, the conveying-end-side conveying surface portion 142a moves along with the support arms 138, and the conveying path 143 is reliably formed up to the outer circumferential surface of the driven sprocket 136 whose position changed.

When the endless roller chain 140 has been tightened, the worker clamps the positioning portion 158 with the upper and lower threaded members 159. Accordingly, the adjustment rod 155 is positioned relative to the conveying case 133 by the positioning mechanism 157, and the coupling body 154 is fixed at the lifted position. The endless roller chain 140 can thus be held in the achieved tension state.

Conveying End Portion of Supply/Convey Device:

As shown in FIGS. 5, 8 and 12, a conveying end portion 132a of the screw conveyor 132, which is the conveying end portion of the supply/convey device 130, is inserted into the threshing tank 111 through a through-hole 163 formed in a rear wall portion 111r of the threshing tank 111 from below the threshing tank 111. A pair of support frames 129 are coupled to the upper portion of the conveying end portion 132a and a front wall portion 111f of the threshing tank 111. The pair of support frames 129 are provided such that the gap between the support frames 129 increases toward the front wall portion 111f. The portion of the conveying end portion 132a inside the tank is supported by the threshing tank 111 via the support frames 129. In the present embodiment, two support frames 129 are provided. However, the present invention is not limited to this, and one or three or more support frames 129 may be provided. An endless belt 167 is wound around a drive pulley 165 of the screw conveyor 132 and a belt pulley 166. Note that the belt pulley 166 is non-relatively-rotatably supported by the support shaft 137 of the slat conveyor 131.

In the screw conveyor 132, motive power is transmitted from the slat conveyor 131 to the drive pulley 165, and a screw 132b is driven by the drive pulley 165. Accordingly, grain supplied by the slat conveyor 131 is transmitted by the screw 132b to a high location inside the threshing tank 111, and is ejected through discharge openings 164 into the threshing tank 111. As a result, grain from the slat conveyor 131 is supplied to the threshing tank 111.

Seal Configuration:

The conveying end portion 132a of the screw conveyor 132 passes through the through-hole 163 of the threshing tank 111. The through-hole 163 is formed in a portion of the rear wall portion 111r of the threshing tank 111 that is near the bottom portion where the lower tapered portion 120 is formed. Also, the discharge openings 164 are formed in the conveying end portion of the conveying end portion 132a. More specifically, the through-hole 163 is formed in a portion of the rear wall portion 111r of the threshing tank 111 that is inclined forward toward the lower end.

Figure 13:
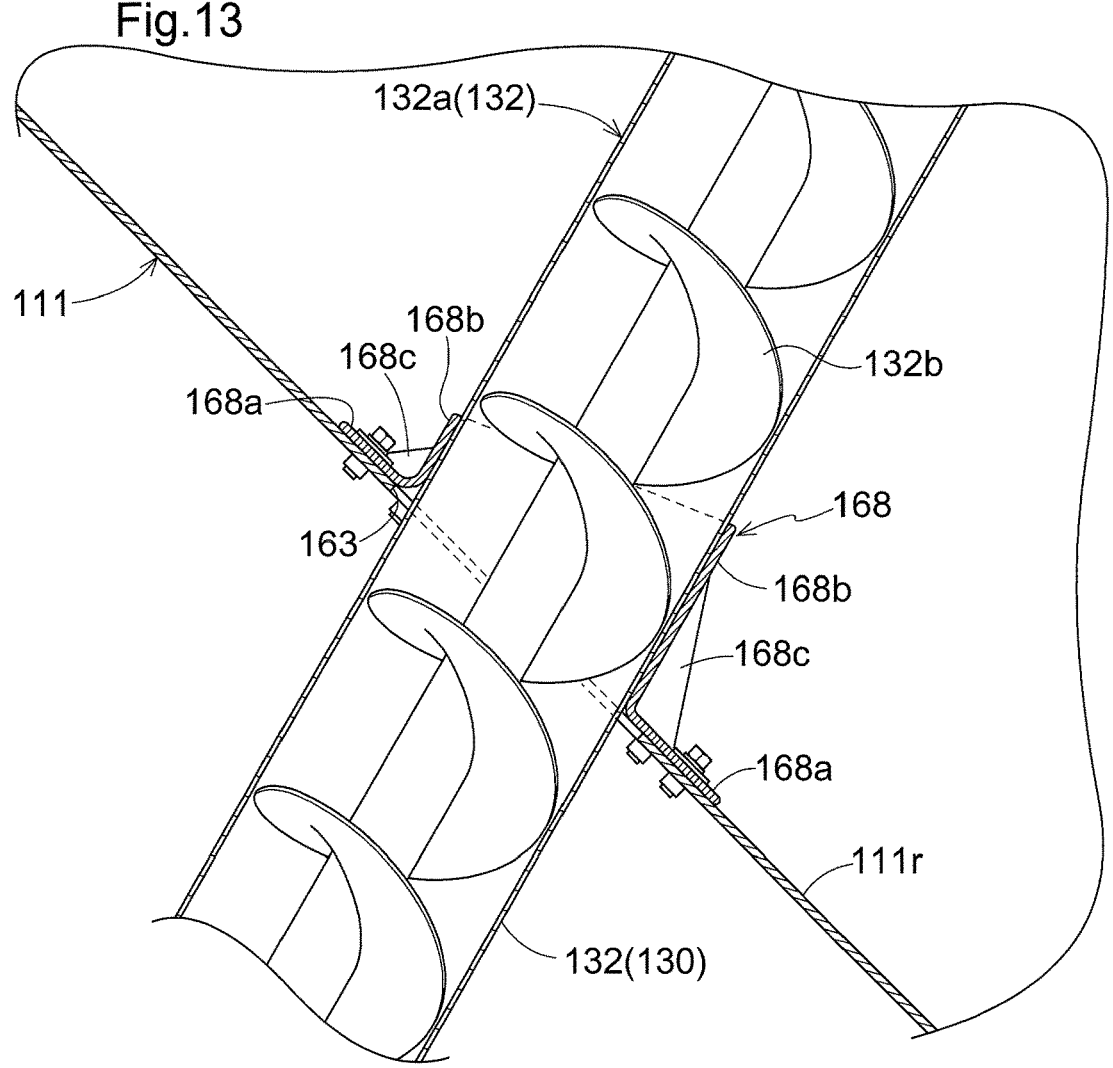
FIG. 13 is a cross-sectional view of a screw conveyor passage portion of a threshing tank.

As shown in FIGS. 12 and 13, a sealing member 168 is arranged between the outer circumferential portion of the through-hole 163 and the conveying end portion 132a. The sealing member 168 is made of a resin. The sealing member 168 is configured to allow the conveying end portion 132a to move relative to the through-hole 163 in the insertion direction due to relative oscillation of the threshing device 110 and the threshing tank 111 while also preventing grain inside the threshing tank 111 from leaking out through the through-hole 163.

Figure 14:
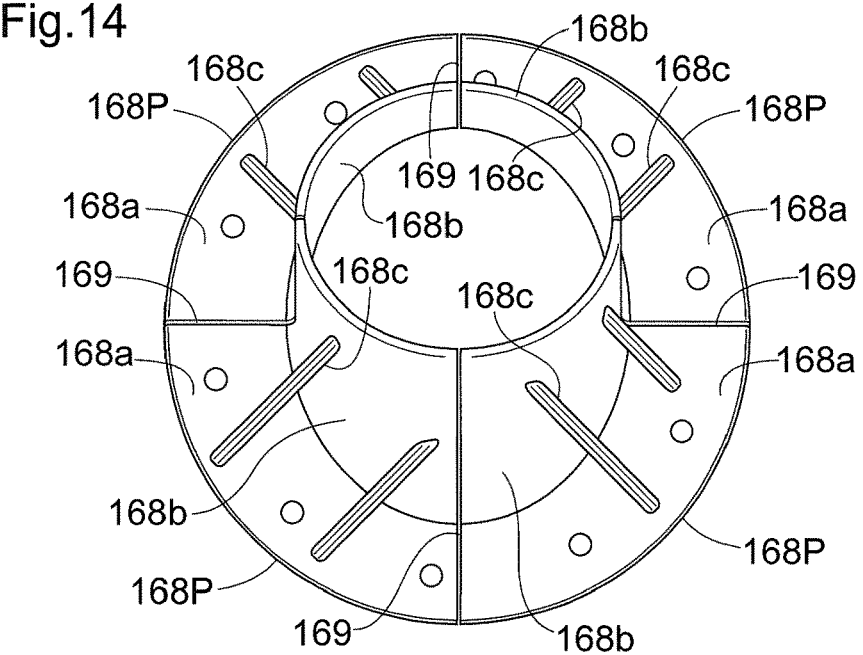
FIG. 14 is a plan view of a sealing member.
Figure 15:
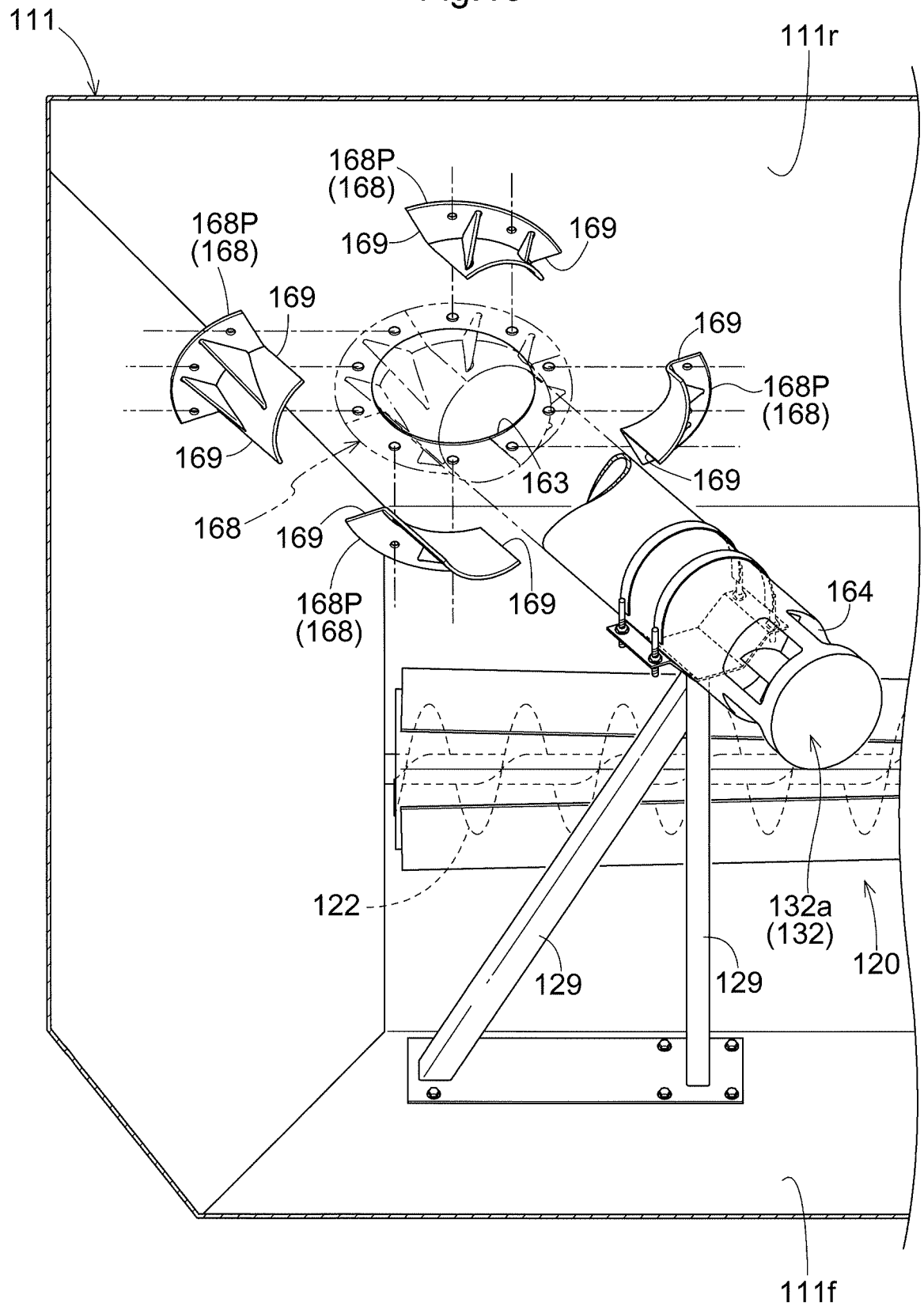
FIG. 15 is a perspective view of the sealing member in state of being divided into sealing member sections.

Specifically, as shown in FIG. 13, the sealing member 168 is provided with a base portion 168a and a sliding contact portion 168b. The base portion 168a is in contact with the inward surface of the rear wall portion 111r. The sliding contact portion 168b extends from the base portion 168a in the insertion direction of the conveying end portion 132a and is in sliding contact with the outward surface of the conveying end portion 132a along the outward surface. The base portion 168a is fastened and fixed to the rear wall portion 111r by attachment screws attached at multiple locations in the circumferential direction. As shown in FIGS. 13 and 14, multiple rib portions 168c are provided extending between the base portion 168a and the sliding contact portion 168b. The rib portions 168c are arranged at intervals in the circumferential direction of the sliding contact portion 168b. As shown in FIG. 14, divided portions 169 are provided over the base portion 168a and the sliding contact portion 168b at four locations in the circumferential direction of the conveying end portion 132a of the sealing member 168. As shown in FIGS. 14 and 15, the sealing member 168 is constituted by four sealing member section 168P that are divided in the circumferential direction of the conveying end portion 132a. The sealing member 168 can be mounted as the four separate sealing member sections 168P.

Figure 16:
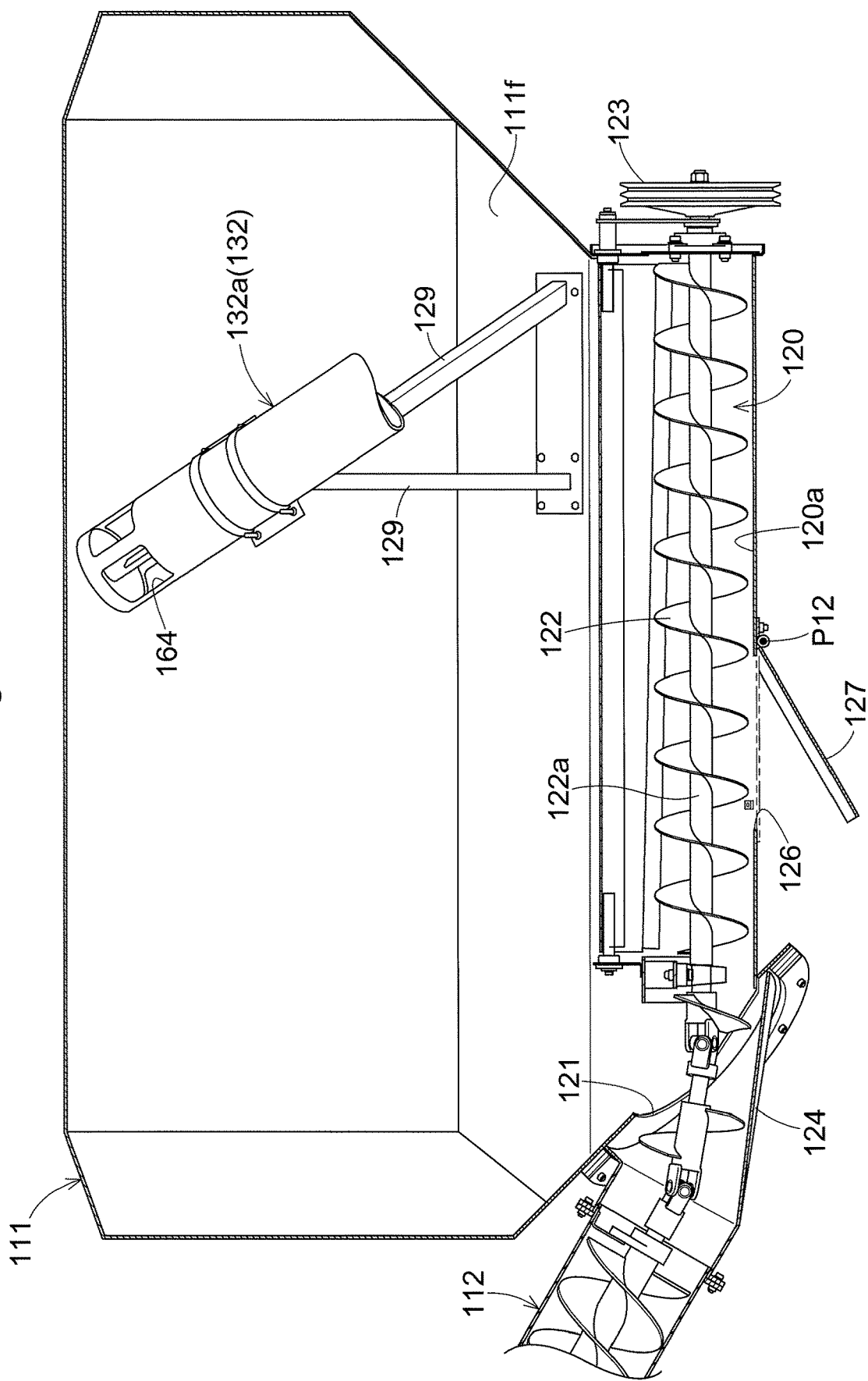
FIG. 16 is a front view of the bottom screw and the inspection port.

Configurations of Threshing Tank and Threshing Discharge Device:

As shown in FIGS. 5 and 8, the front wall portion 111f of the threshing tank 111 is inclined such that the lower portion extends rearward as it extends downward. Also, the rear wall portion 111r of the threshing tank 111 is inclined such that the lower portion extends forward as it extends downward. Accordingly, a lower tapered portion 120 that extends over the full width of the bottom portion of the threshing tank 111 is formed at the bottom portion. As shown in FIGS. 8 and 16, the lower tapered portion 120 is provided with a bottom portion 120a that is in a horizontal orientation, a front side plate portion that rises up from the front end portion of the bottom portion 120a, and a rear side plate portion that rises up from the rear end portion of the bottom portion 120a. A discharge opening 121 is formed in the end portion of the lower tapered portion 120 that is at the left side of the threshing tank. A bottom screw 122 is rotatably provided inside the lower tapered portion 120. A drive pulley 123 is non-relatively-rotatably supported by a screw shaft 122a of the bottom screw 122 outside the lower tapered portion 120 at the right side of the threshing tank.

As shown in FIGS. 6 and 16, a connection case 124 is provided at the left end portion of the bottom portion of the threshing tank 111. The threshing discharge device 112 extends from the connection case 124. The threshing discharge device 112 and the bottom screw 122 are connected via the connection case 124. The threshing discharge device 112 and the bottom screw 122 are interlockingly joined inside the connection case 124. Accordingly, motive power can be transmitted from the bottom screw 122 to the threshing discharge device 112.

Specifically, the threshing discharge device 112 is constituted by a screw conveyor that extends from the connection case 124. A conveyor cylinder of the screw conveyor is in communication with the discharge opening 121 via the connection case 124. Inside the connection case 124, a screw shaft of the screw conveyor and the screw shaft 122a of the bottom screw 122 are coupled to each other. Accordingly, motive power is transmitted from the bottom screw 122 to the screw conveyor.

The connection case 124 is rotatably supported by the threshing tank 111. As shown in FIG. 6, a hydraulic cylinder 125 is coupled to the connection case 124. Accordingly, the connection case 124 can rotate due to extension and retraction of the hydraulic cylinder 125.

The connection case 124 is rotated by the hydraulic cylinder 125 in order to discharge grain from the threshing tank 111. Accordingly, the threshing discharge device 112 is changed from a stowed state of extending along a lateral portion of the machine body to an in-use state of protruding laterally outward from the machine body.

When a power transmission system, which is for transmitting motive power from the engine 113 to the drive pulley 123, is switched to a power transmission on state, the drive pulley 123 is driven, and the bottom screw 122 is driven. Then, motive power is transmitted from the bottom screw 122 to the threshing discharge device 112, and the threshing discharge device 112 is driven. When the bottom screw 122 and the threshing discharge device 112 are driven, the bottom screw 122 discharges grain stored in the threshing tank 111 through the discharge opening 121 to the inside of the connection case 124. The grain discharged into the connection case 124 is received by the threshing discharge device 112 and conveyed by the threshing discharge device 112 so as to be discharged from a discharge opening 112a (see FIG. 6) provided in the leading end portion of the threshing discharge device 112.

As shown in FIG. 16, the lower tapered portion 120 is provided with an inspection port 126 and a lid 127 for opening and closing the inspection port 126. The inspection port 126 is formed in the bottom portion 120a of the lower tapered portion 120. Grain remaining in the lower tapered portion 120 can be discharged through the inspection port 126. The lid 127 is supported by the bottom portion 120a so as to open and close by swinging upward and downward about a pivot axis P12 of a hinge member.

As shown in FIG. 5, a return screw conveyor 170 extends from a lower portion of the threshing device 110. A second product obtained by the sorting portion of the threshing device 110 is supplied to the return screw conveyor 170 by a second screw conveyor 171 (see FIG. 17), and is returned to a swing sorting device (not shown) by the return screw conveyor 170.

Figure 17:
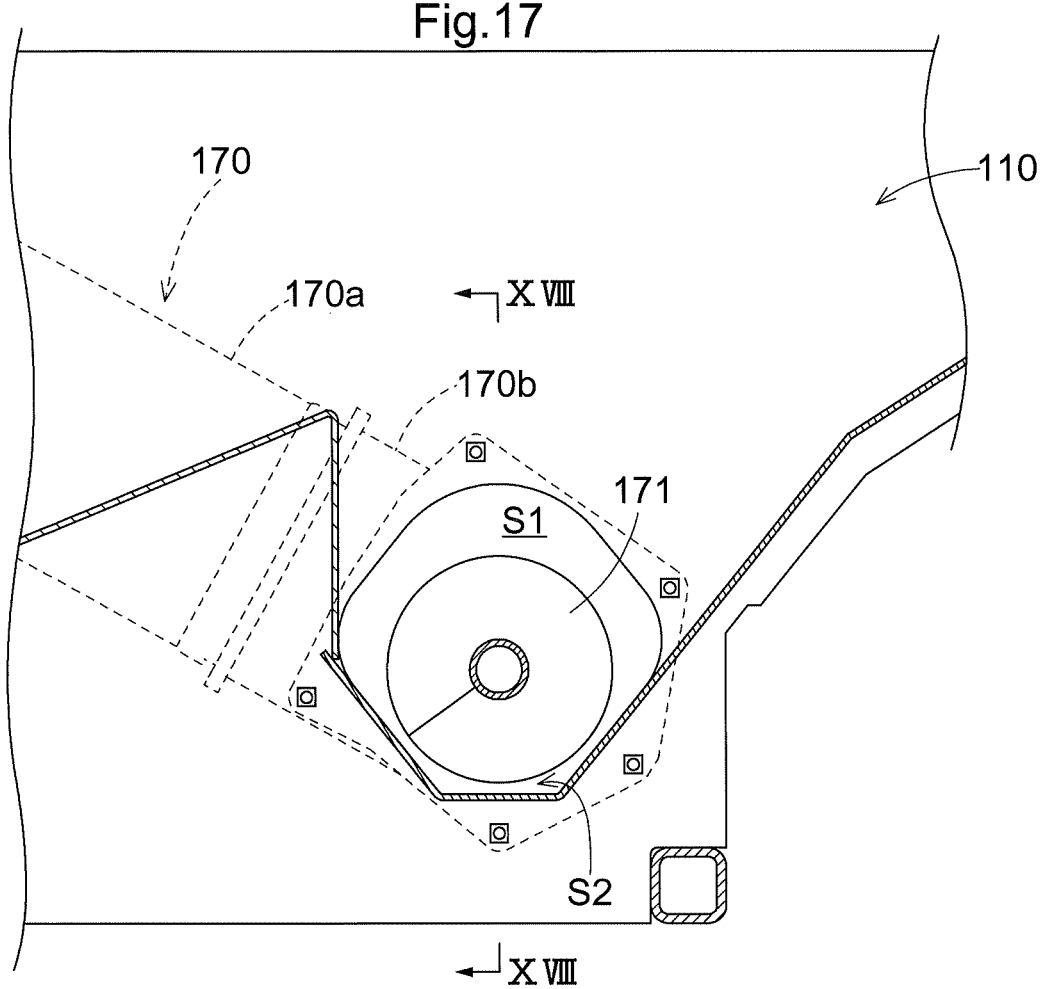
FIG. 17 is a side view of a connection portion where a second screw conveyor and a return screw conveyor are connected.
Figure 18:
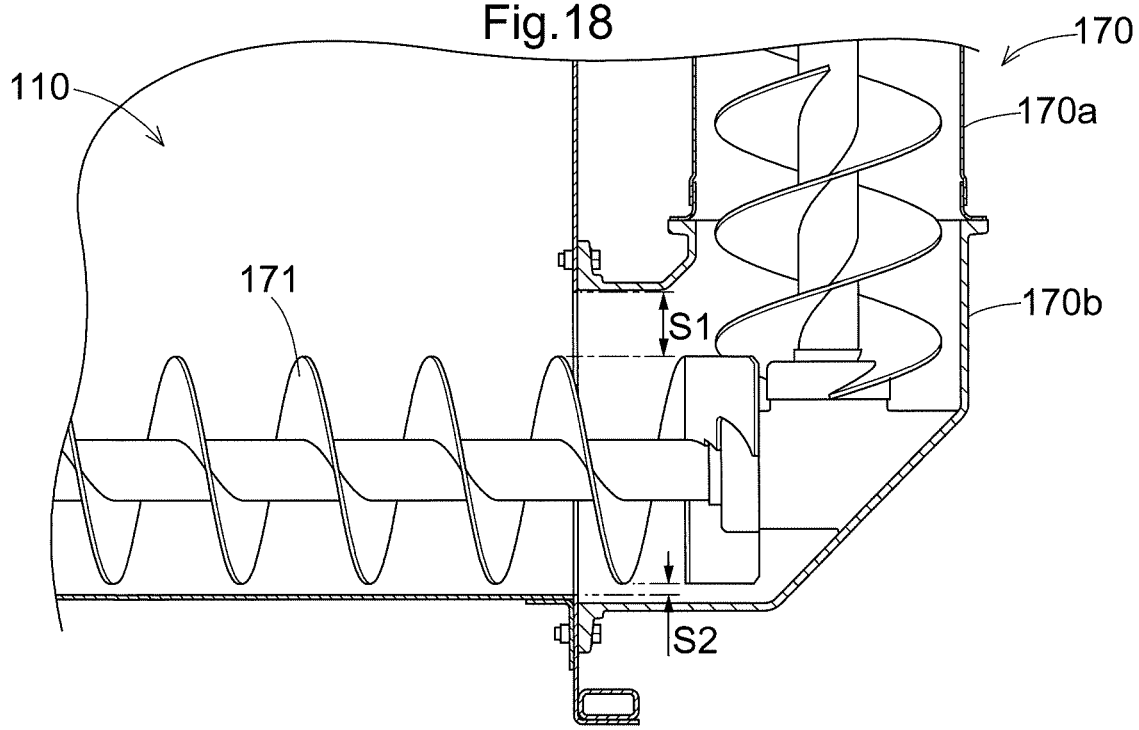
FIG. 18 is a cross-sectional view of the connection portion where the second screw conveyor and the return screw conveyor are connected.

As shown in FIGS. 17 and 18, the return screw conveyor 170 includes a vertically-oriented vertical conveying case 170a and a connection case 170b that extends from the lower portion of the vertical conveying case 170a toward the threshing device, is fitted around the second screw conveyor 171, and receives the second product from the second screw conveyor 171. In the connection case 170b, a case interior space 51 above the second screw conveyor 171 is larger than a case interior space S2 below the screw conveyor 171.

Inside the connection case 170b, the second product flows upward from the second screw conveyor 171 and is received by the return screw conveyor 170. At this time, because the case interior space 51 is large, the second product smoothly flows toward the return screw conveyor 170.

Variations of Second Embodiment

The following describes modifications of the embodiment described above. The matter other than the matter described in the following variations is similar to the matter described above embodiment. The above embodiment and the following variations may be appropriately combined as long as no contradiction arises. The scope of the present invention is not limited to the above-described embodiment and the following variations.

(1) In the above embodiment, an example of employing the supply/convey device 130 that includes the drive sprocket 135, the driven sprocket 136, and the endless roller chain 140 is illustrated. However, the present invention is not limited to this. The supply/convey device may include a drive pulley and a drive wheel as drive rotating bodies, include a driven pulley and a driven wheel as driven rotating bodies, and include an endless strip such as an endless belt as the endless rotating body, for example.

(2) Although an example in which the support shaft 137 is laterally oriented is illustrated in the above embodiment, the present invention is not limited to this. For example, a configuration is possible in which the support shaft 137 extends in the front-rear direction, the support arms 138 are provided outward of the front wall portion and the rear wall portion of the conveying case 133, and the connecting member is provided extend along the outward surface of the lateral wall portion of the outer circumferential surface of the conveying case.

(3) In the above embodiment, an example is illustrated in which the position adjustment mechanism 160 is constituted by the adjustment rod 155 and the positioning mechanism 157, but the position adjustment mechanism may be configured such that the position of the coupling body 154 relative to the conveying case 133 is adjusted without intervention of the adjustment rod 155.

(4) Although an example in which the adjustment rod 155 extends along the connecting member 153 is illustrated in the above embodiment, a configuration in which the adjustment rod 155 extends from a support arm 138 may be employed.

(5) Although an example in which the first holding member 156 and the second holding member 152 are provided is illustrated in the above embodiment, a configuration is possible in which only either the first holding member 156 or the second holding member 152 is provided. Also, a configuration is possible in which both the first holding member 156 and the second holding member 152 are not provided.

(6) Although an example in which the supply/convey device 130 is constituted by the slat conveyor 131 and the screw conveyor 132 is illustrated in the above embodiment, the present invention is not limited to this. The supply/convey device may be constituted by only the slat conveyor.

Third Embodiment

Hereinafter, a third embodiment, which is an example of the present invention, will be described with reference to FIGS. 19 to 27. Specifically, the following describes a case in which an embodiment of a harvester according to the present invention is applied to a normal-type combine.

Figure 19:
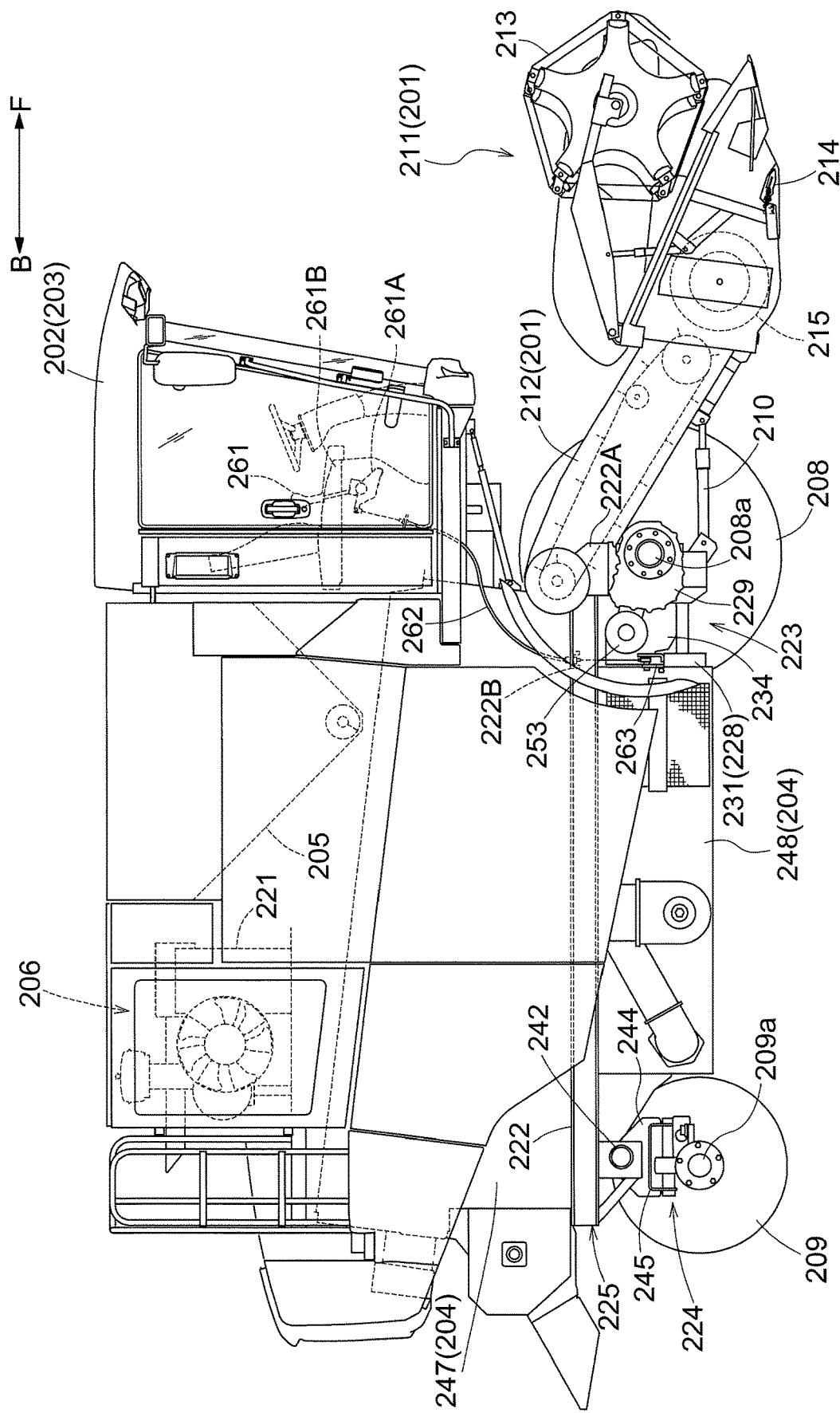
FIG. 19 is a diagram showing a third embodiment (hereinafter, the same applies up to FIG. 27), and is a right side view of a combine.
Figure 20:
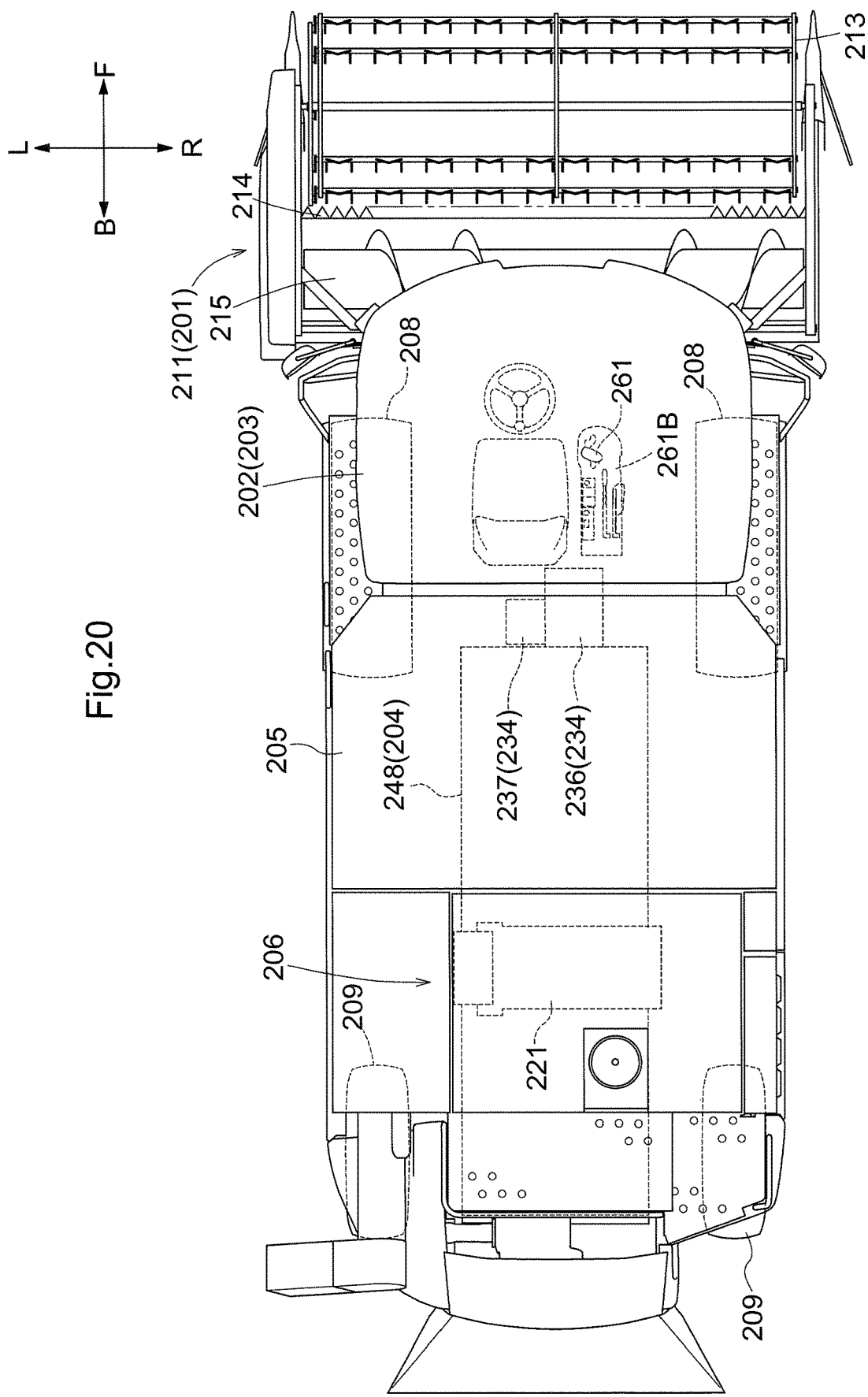
FIG. 20 is a plan view of the combine.

Overall Configuration:

As shown in FIGS. 19 and 20, a combine includes a reaping/conveying unit 201 that reaps and conveys a crop rearward, a driver portion 203 that is surrounded by a cabin 202, a threshing device 204 that threshes the crop reaped by the reaping/conveying unit 201, a grain tank 205 that stores grain obtained by the threshing performed by the threshing device 204, a motor power portion 206 having an engine 221 as a drive source, a pair of left and right front wheels 208 as traveling devices that are not steerable and are driven to rotate, and a pair of left and right rear wheels 209 that are steerable. The driver portion 203 is arranged adjacent to the front of the threshing device 204.

In this embodiment, the front-rear direction of the machine body is defined as extending along the body advancing direction in the operating state, and the left-right direction of the machine body is defined by the left and right in a view along the body advancing direction. Specifically, the direction indicated by reference sign "F" in FIGS. 19, 20, 21, and 22 is "front", and the direction indicated by reference sign "B" in FIGS. 19, 20, 21, and 22 is "rear". The direction indicated by reference sign "L" in FIGS. 20, 21, 22, and 24 is "left", and the direction indicated by reference sign "R" in FIGS. 20, 21, 22, and 24 is "right".

The reaping/conveying unit 201 is swingably/elevatably supported about a lateral support point in the front portion of the machine body. The reaping/conveying unit 201 can be driven to rise and descend by operation of a reaper elevating cylinder 210. The reaping/conveying unit 201 includes a reaping header 211 (corresponding to a "harvesting unit") that reaps a standing crop and gathering the reaped crop toward the central portion in the reaping width direction, and a grain culm conveying device 212 (corresponding to a "conveying device") that conveys the whole culm of the reaped and gathered crop rearward toward the threshing device 204. As shown in FIG. 19, the grain culm conveying device 212 extends from the reaping header 211 rearward and upward toward the threshing device 204. The driver portion 203 is provided at a position above the grain culm conveying device 212.

The reaping header 211 includes a rotary reel 213 that rakes in the reaping-target crop with the grain tip facing rearward, clipper-type reaping blades 214 for cutting the stalk base of the crop, a horizontal feed auger 215 for gathering the reaped crop to the central portion in the reaping width direction, and the like.

The threshing device 204 is provided at a position below the center in the body left-right direction. The grain tank 205 is provided in front of and above the threshing device 204. Also, the engine 221 is provided as a drive source behind and above the threshing device 204. In other words, the grain tank 205 and the engine 221 are aligned in the front-rear direction.

Body Support Structure:

The following describes the body support structure.

Figure 21:
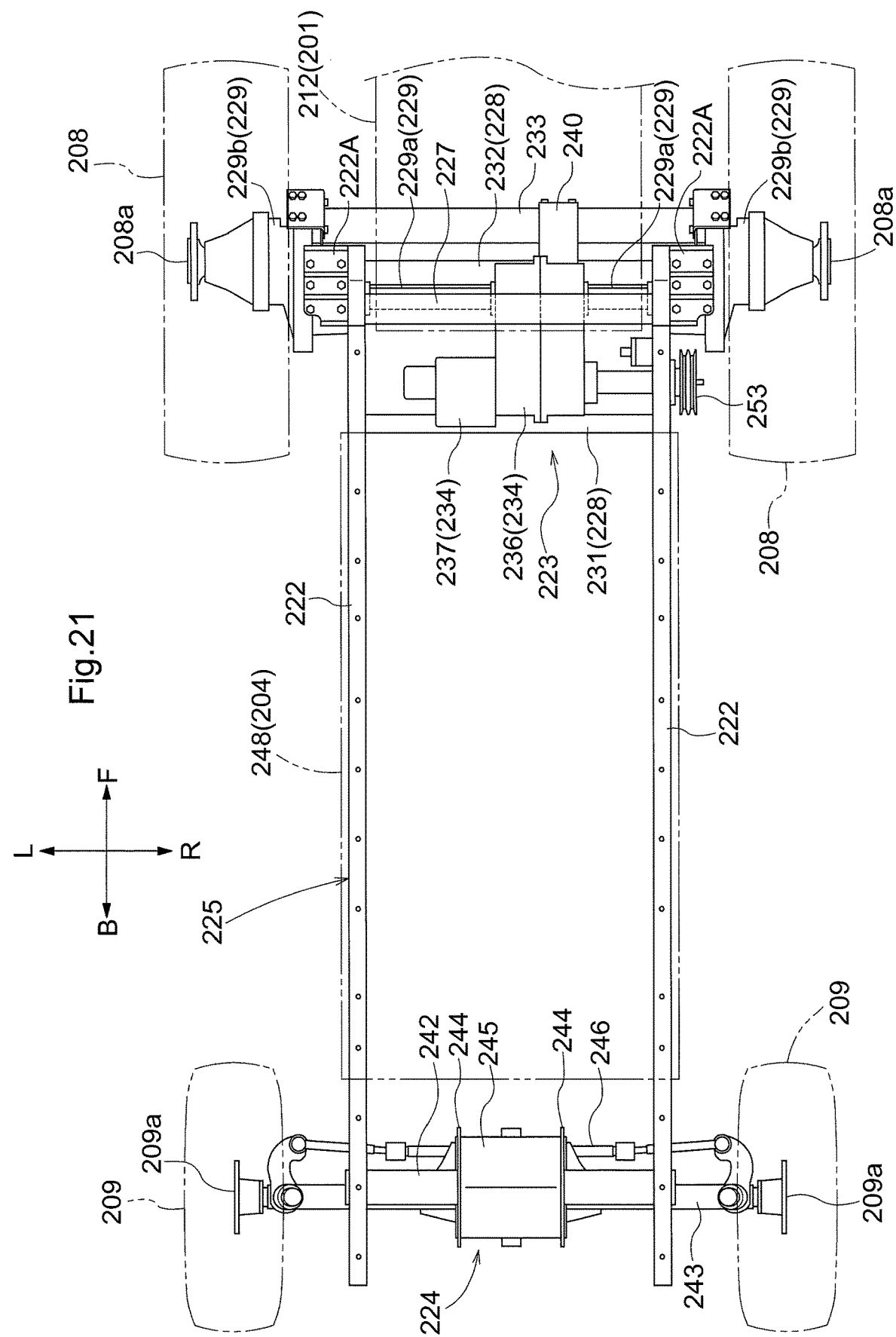
FIG. 21 is a plan view of a body support structure.

As shown in FIG. 21, a body frame 225 that overall supports the machine body is constituted by a pair of left and right main frames 222 (corresponding to "support frames") that extend in the body front-rear direction, a front coupling portion 223 that couples the front portions of the left and right main frames 222, and a rear coupling portion 224 that couples the rear portions of the left and right main frames 222.

The left and right main frames 222 are constituted by channel members having an approximately C-shaped cross-section, and as shown in FIG. 19, extend in the front-rear direction from the body front portion to the body rear portion. The wheels 208a and 209a that constitute the left and right front wheels 208 and the left and right rear wheels 209 are provided at a position lower than the left and right main frames 222. As shown in FIG. 21, the left and right front wheels 208 and the left and right rear wheels 209 are provided so as to be located outward of the left and right main frames 222 in the body left-right direction. The left and right main frames 222 are supported by the left and right front wheels 208 and the left and right rear wheels 209.

The left and right main frames 222 each include a base portion 222A. The base portions 222A are integrally coupled so as to project forward from the front end portions of the left and right main frames 222.

The following describes the front coupling portion 223.

As shown in FIG. 21, the front coupling portion 223 includes an upper horizontal frame 227 that couples the left and right base portions 222A of the main frames 222, and a lower horizontal frame 228 (corresponding to a "connecting frame") that couples left and right side portions that are below the left and right base portions 222A.

The upper horizontal frame 227 extends between the left and right base portions 222A, and the left and right sides thereof are integrally coupled to the base portions 222A. Left and right axle cases 229 (corresponding to "drive shaft cases") that rotatably support the left and right front wheels 208 are coupled to the lower surface sides of the left and right base portions 222A. Accordingly, the front portion sides of the main frames 222 are supported by the front wheels 208. In other words, the main frames 222 extend along the front-rear direction above the axle cases 229. The axle cases 229 are supported by the base portions 222A of the main frames 222. The axle cases 229 will be described later.

Figure 23:
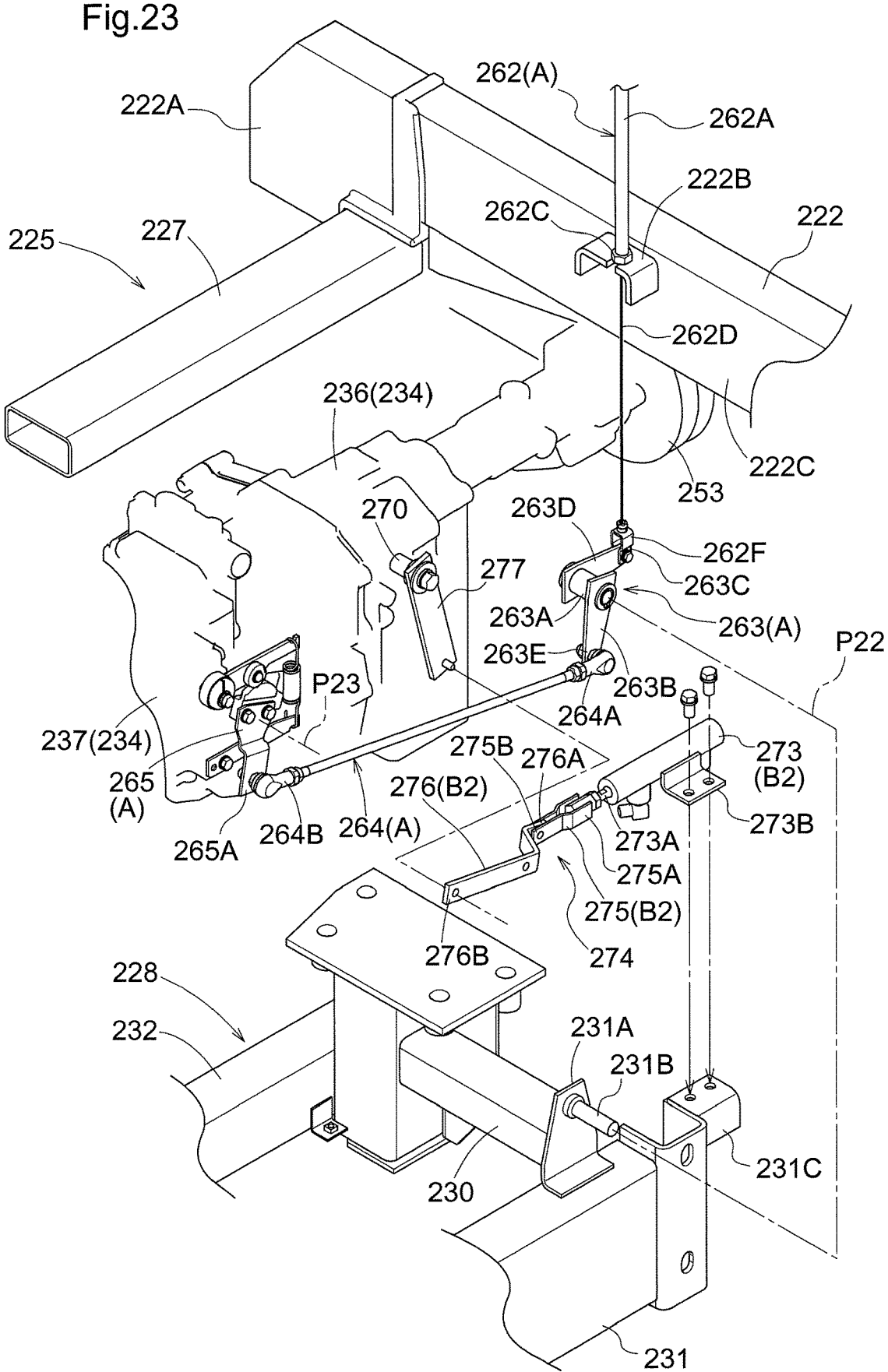
FIG. 23 is an exploded view of a support structure for supporting a transmission mechanism and an operation mechanism.

As shown in FIG. 23, the lower horizontal frame 228 includes left and right longitudinal coupling bodies 230 that extend in the front-rear direction, a rear lateral coupling body 231 that couples rear portions of the left and right longitudinal coupling bodies 230, and a front lateral coupling body 232 that couples front portions of the left and right longitudinal coupling bodies 230. The front lateral coupling body 232 is bolt-fastened to the left and right axle cases 229. Rear lower portions of the left and right axle cases 229 are coupled to a lateral pipe frame 233, which is a round pipe member. The space inside the lateral pipe frame 233 is used as a hydraulic fluid storage portion.

Figure 25:
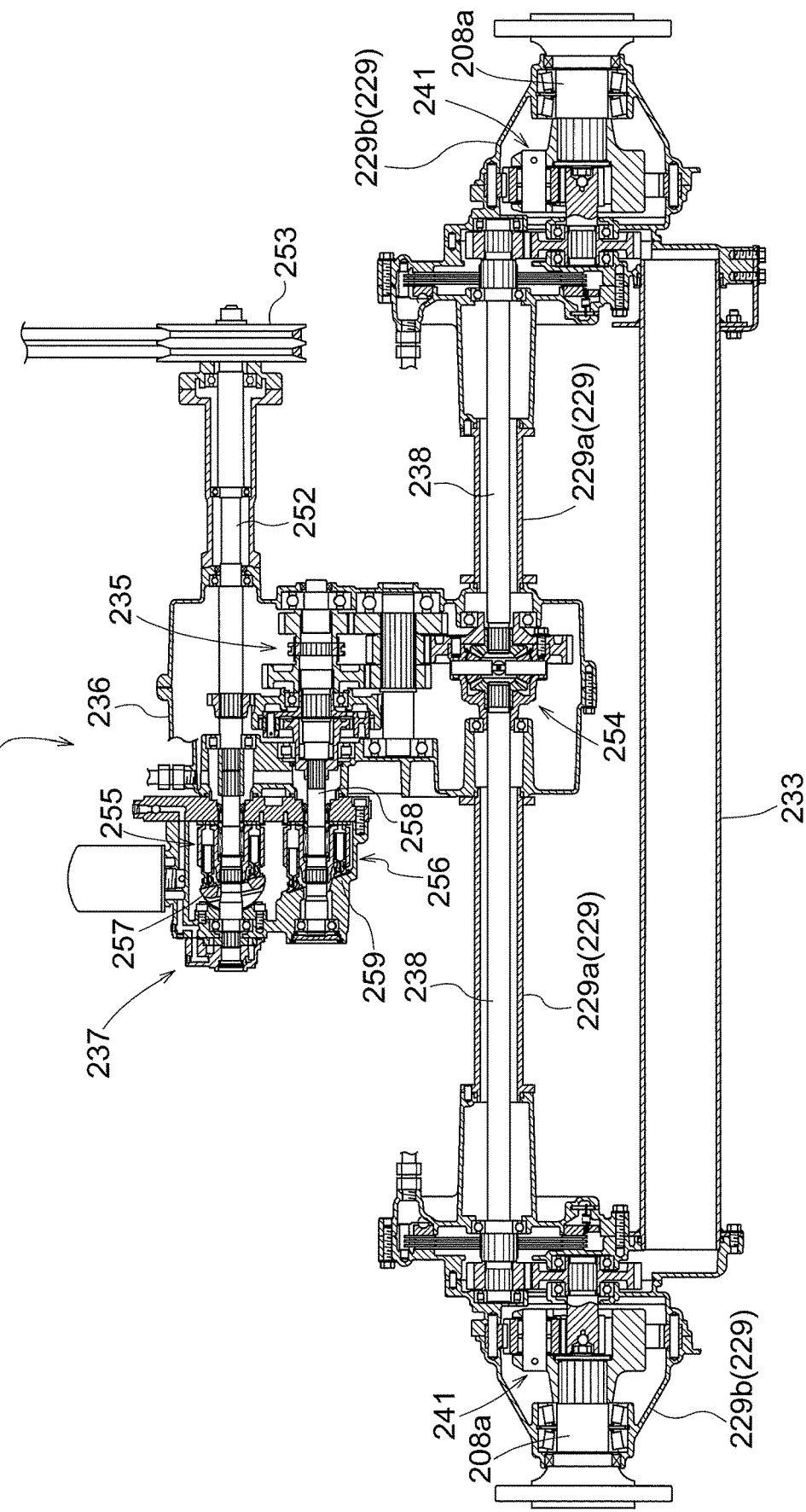

A travel transmission device 234 that performs gear-change on motive power from the engine 221 is provided between the upper horizontal frame 227 and the lower horizontal frame 228. As shown in FIG. 25, the travel transmission device 234 includes a transmission case 236 that houses a gear-type transmission mechanism 235 (corresponding to a "gear transmission apparatus"), and a hydrostatic stepless transmission apparatus (HST) 37 (corresponding to a "transmission apparatus") that is integrally coupled to one lateral side of the transmission case 236. As shown in FIG. 19, the travel transmission device 234 (hydrostatic stepless transmission 237) is provided at a position that is adjacent to the front of the threshing device 204 and below the grain culm conveying device 212.

Left and right travel drive shafts 238 (corresponding to "drive shafts"), which extend outward in the left-right direction from left and right portions of the transmission case 236 and are for transmitting adapted motive power to the left and right front wheels 208, and left and right axle cases 229 (corresponding to "drive shaft cases"), which respectively cover the left and right travel drive shafts 238, are provided on the left and right sides of the transmission case 236. A front end portion of the transmission case 236 is coupled to an intermediate portion, with respect to the left-right direction, of the lateral pipe frame 233 via a coupling member 240.

The left and right axle cases 229 each include a cylindrical case portion 229a and a front wheel drive case portion 229b. The cylindrical case portion 229a extends laterally outward from the transmission case 236. The front wheel drive case portion 229b is connected to the cylindrical case portion 229a, houses a gear-type deceleration mechanism 241 (see FIG. 25), and supports the corresponding front wheel 208. The cylindrical case portion 229a and the front wheel drive case portion 229b are integrally coupled to each other. The left and right front wheel drive case portions 229b are coupled by the lower horizontal frame 228.

The following describes the rear coupling portion 224.

As shown in FIG. 21, the rear coupling portion 224 includes a rear coupling body 242 that is constituted by a round pipe member and extends between the left and right main frames 222 at a position below the left and right main frames 222. Also, a rear wheel support body 243, which extends between the left and right rear wheels 209, is supported by the rear coupling body 242 so as to be capable of swinging about a longitudinal axis.

Also, portions of the left and right main frames 222 at the rear side of the vehicle bodies are provided with left and right support frames 244 that project downward. Also, the rear coupling body 242 is coupled so as to span between the left and right support frames 244. A rolling support portion 245 is fixed to a lateral intermediate portion of the rear coupling body 242, and an intermediate portion, with respect to the body width direction, of the lateral rear wheel support body 243 is supported by the rolling support portion 245 so as to be capable of swinging about an axis that extends in the body front-rear direction.

The left and right rear wheel 209 are supported by the left and right end portions of the rear wheel support body 243 so as to be capable of swinging about a longitudinal axis, and a steering cylinder 246 is provided extending along the left-right direction rearward of the rear wheel support body 243. The rear wheels 209 can swing about the longitudinal axis when the steering cylinder 246 in order to steer the machine body.

Threshing Device Support Structure:

The following mainly describes a support structure for supporting the threshing device 204.

As shown in FIG. 19, the threshing device 204 includes a threshing unit 247 that performs threshing and a sorting portion 248 that performs sorting processing on the product of the threshing performed by the threshing unit 247.

The threshing unit 247 includes an approximately box-shaped frame that surrounds the outer circumference, and a threshing cylinder that is provided inside the frame and rotates about a rotation shaft that extends in the body front-rear direction.

The frame that constitutes the threshing unit 247 is placed on and supported by the left and right main frames 222. Although not described in detail, the frame includes left and right side wall portions, a rear wall portion, and a front wall portion that are integrally coupled to each other. Multiple reinforcement support bodies constituted by rectangular tube members, angle members, or the like are also included.

The sorting portion 248 includes a frame constituted by a rectangular peripheral wall portion, and a sorting processing unit that is provided inside the frame and is for shaking to move the threshed product so as to be sorted into secondary products such as grain and grain with branches, and straw waste, for example.

The frame that constitutes the sorting portion 248 is hung from and supported by the left and right main frames 222. Although not described in detail, the frame is shaped as a rectangular frame and includes side wall portions that cover the left and right sides of the sorting portion 248 and a front support portion that couples the front portion sides of the left and right side wall portions. Upper end portions of the left and right side wall portions are brought into contact with the lower surfaces of the left and right main frames 222 and fixed thereto by bolt fastening. The frame is thus supported in a hung manner.

As shown in FIG. 19, the rear lateral coupling body 231 of the lower horizontal frame 228 is connected to the front end portion of the sorting portion 248. The rear lateral coupling body 231 of the lower horizontal frame 228 is also connected to the sorting portion 248 of the threshing device 204. The front lateral coupling body 232 of the lower horizontal frame 228 is connected to the transmission case 236 via the axle cases 229, the lateral pipe frame 233, and the coupling member 240. In other words, the lower horizontal frame 228 connects the threshing device 204 and the transmission case 236 (gear-type transmission mechanism 235).

Power Transmission Structure:

The following describes a power transmission structure for transmitting motive power from the engine 221 to the front wheel 208.

As shown in FIG. 25, the transmission case 236 of the travel transmission device 234 includes an input shaft 252 that projects outward to the right side of the machine body. Specifically, the input shaft 252 of the hydrostatic stepless transmission 237 passes through the transmission case 236 and projects rightward from the right side surface of the transmission case 236. An input pulley 253 is provided on the input shaft 252. Motive power is input from the engine 221 to the input pulley 253.

The motive power transmitted to the input shaft 252 is adapted by the hydrostatic stepless transmission 237 and the gear-type transmission mechanism 235 in the transmission case 236, is then transmitted to the left and right travel drive shafts 238 via a differential mechanism 254, and then transmitted to wheel shafts 208a of the front wheels 208 via gear-type deceleration mechanisms 241.

The following describes the structure of the travel transmission device 234.

As shown in FIG. 25, the hydrostatic stepless transmission 237 includes a hydraulic pump 255 and a hydraulic motor 256. The hydraulic pump 255 includes an input shaft 252 and a pump swash plate 257. Also, the hydraulic motor 256 includes a motor output shaft 258 and a motor swash plate 259.

Motive power input from the engine 221 to the input shaft 252 is transmitted to the motor output shaft 258 via the pump swash plate 257 and the motor swash plate 259. At this time, drive power is adapted between the pump swash plate 257 and the motor swash plate 259 in the power transmission path.

The drive power transmitted to the motor output shaft 258 is transmitted to the differential mechanism 254 via the gear-type transmission mechanism 235. At this time, the drive power is adapted in the gear-type transmission mechanism 235. The drive power transmitted to the differential mechanism 254 is then distributed to the left and right travel drive shafts 238.

The left and right travel drive shafts 238 are provided extending outward from the differential mechanism 254 in the body left-right direction. The travel drive shafts 238 are coupled to the wheel shafts 208a via the gear-type deceleration mechanisms 241. As shown in FIG. 21, the front wheels 208 are fixed to the wheel shafts 208a. According to this configuration, motive power transmitted to the travel drive shafts 238 is transmitted to the front wheels 208 via the gear-type deceleration mechanism 241 and the wheel shafts 208a. The front wheels 208 are thus driven. In other words, the hydrostatic stepless transmission 237 adapts motive power from the engine 221 and transmits the adapted motive power to the front wheels 208 via the gear-type transmission mechanism 235, the travel drive shaft 238, the gear-type deceleration mechanism 241, and the wheel shafts 208a. The gear-type transmission mechanism 235 is arranged between the hydrostatic transmission apparatus 237 and the front wheels 208, and adapts the motive power from the hydrostatic stepless transmission 237 and transmits the adapted motive power to the front wheels 208.

Transmission Mechanism:

The hydrostatic stepless transmission 237 includes a trunnion shaft 260. The trunnion shaft 260 projects rearward from the rear surface of the hydrostatic stepless transmission 237. The trunnion shaft 260 is arranged such that the central axis (axis P23) thereof is parallel with the body front-rear direction. When the trunnion shaft 260 is rotated, the angle of the pump swash plate 257 of the hydrostatic stepless transmission 237 changes, and the transmission ratio in the hydrostatic stepless transmission 237 changes.

Figure 26:
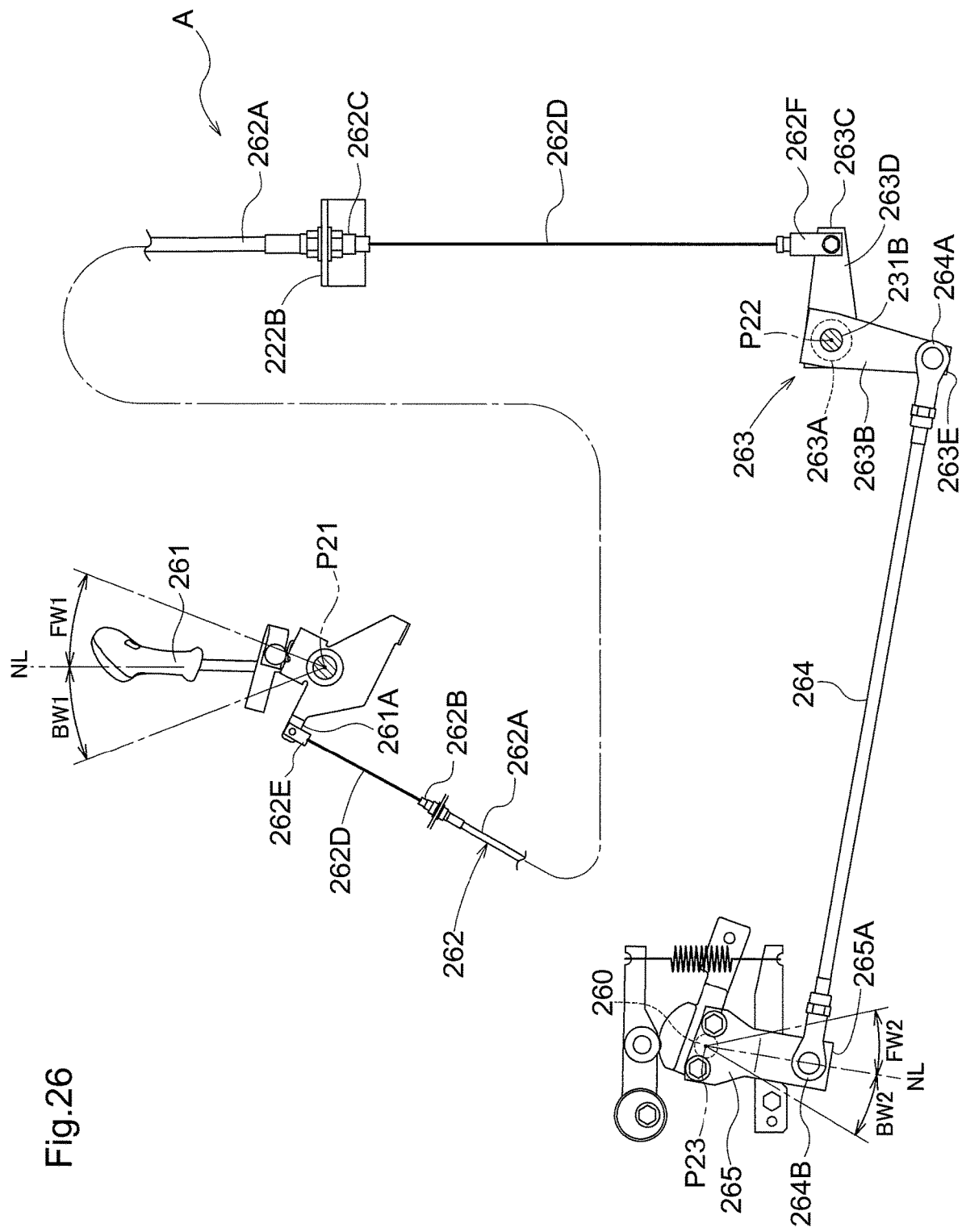
FIG. 26 is a schematic view of a configuration of the transmission mechanism.

As shown in FIGS. 19 and 20, a manual main gearshift lever 261 (corresponding to a "transmission operation tool") for instructing a change in the transmission state of the hydrostatic stepless transmission 237 is provided in the driver portion 203. As shown in FIG. 26, a transmission mechanism A transmits operation force from the main gearshift lever 261 to the trunnion shaft 260 of the hydrostatic stepless transmission 237. The transmission mechanism A includes an operation wire 262, a right arm portion 263 (corresponding to a "second arm"), a rod 264, and a left arm portion 265 (corresponding to a "first arm").

Operation Wire

The operation wire 262 includes an outer casing 262A and an inner wire 262D. The inner wire 262D is inserted into the outer casing 262A in a state of being capable of moving relative to the outer casing 262A.

Out of the two end portions of the outer casing 262A, an end portion 262B on the main gearshift lever 261 side is arranged inside the driver portion 203, and is fixed inside an operation panel portion 261B (see FIGS. 19 and 20) that supports the main gearshift lever 261.

Figure 24:
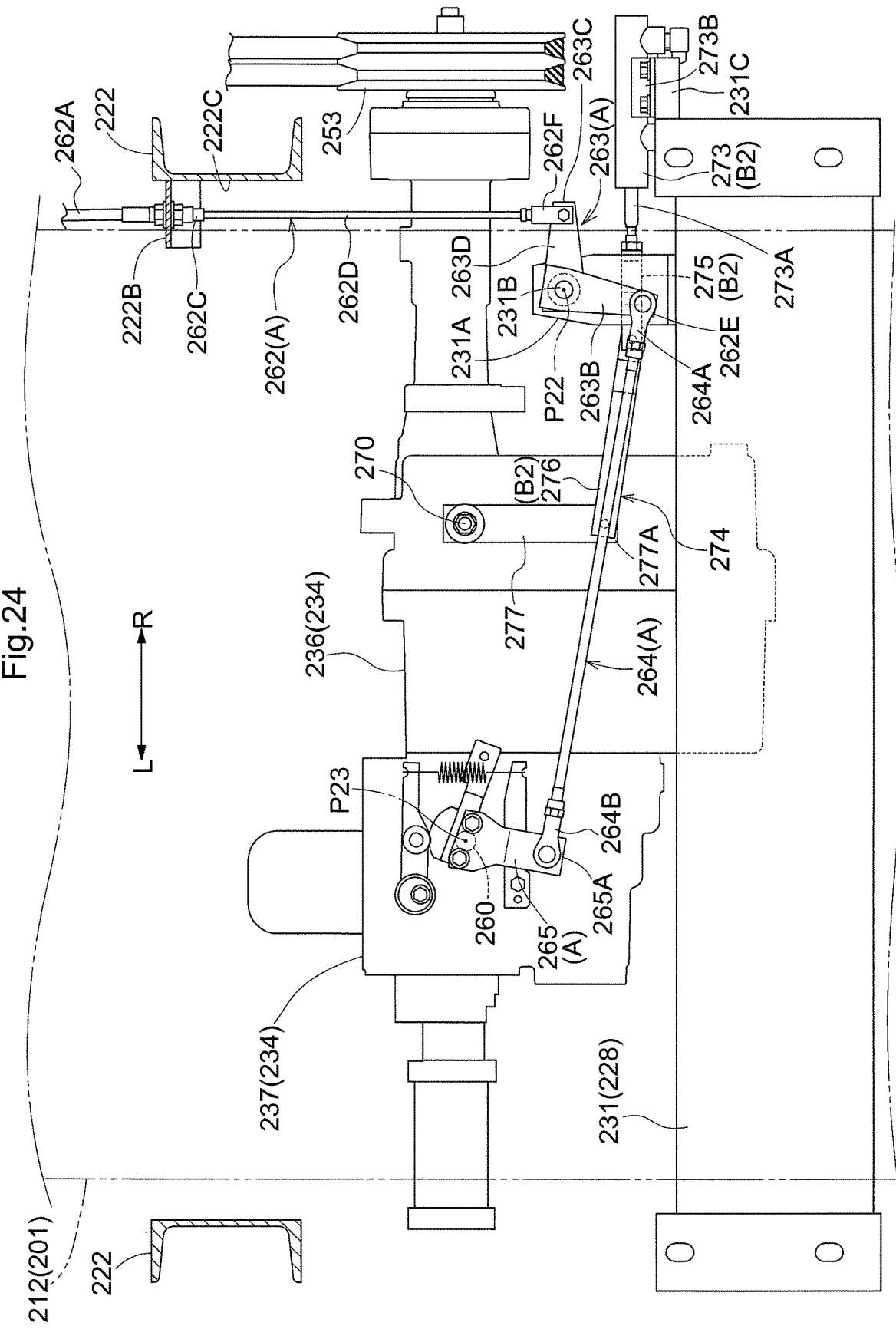
FIG. 24 is longitudinal sectional view of the transmission mechanism and the operation mechanism.

Out of the two end portions of the outer casing 262A, an end portion 262C on the hydrostatic stepless transmission 237 side is supported by a bracket 222B (corresponding to a "support portion") of the right main frame 222, as shown in FIGS. 23 and 24. The bracket 222B is provided on a left side surface 222C of the right main frame 222, which is on the side where the hydrostatic stepless transmission 237 is located.

Out of the two end portions of the inner wire 262D, an end portion 262E (corresponding to a "fourth end portion") on the main gearshift lever 261 side is connected to an arm end 261A of the main gearshift lever 261, as shown in FIG. 26.

Out of the two end portions of the inner wire 262D, an end portion 262F (corresponding to a "third end portion") on the hydrostatic stepless transmission 237 side is connected to the right arm portion 263 (described later), as shown in FIG. 26.

As shown in FIG. 24, the inner wire 262D extends upward from the connection portion (end portion 262F) that is connected to the right arm portion 263. In other words, the operation wire 262 extends upward from the connection portion that is connected to the rod 264 via the right arm portion 263.

As shown in FIG. 19, the operation wire 262 extends diagonally rearward and downward from the driver portion 203, extends downward behind the grain culm conveying device 212, and extends downward behind the transmission case 236.

Right Arm Portion:

As shown in FIGS. 23, 24, and 26, the right arm portion 263 includes a cylinder 263A, a rear arm plate 263B that extends downward from a rear portion of the cylinder 263A, and a front arm plate 263D that extends downward from a front portion of the cylinder 263A. The cylinder 263A is a hollow cylinder, and is supported so as to be relatively rotatable by a shaft member 231B of a bracket 231A provided on an upper surface of the rear lateral coupling body 231 of the lower horizontal frame 228. The shaft member 231B is arranged such that the central axis (axis P22) thereof is parallel with the body front-rear direction. The cylinder 263A, the rear arm plate 263B, and the front arm plate 263D can undergo swing displacement about the axis P22. In other words, the right arm portion 263 can undergo swing displacement about the axis P22 that is parallel to the body front-rear direction.

As shown in FIGS. 23, 24, and 26, the end portion 262F of the inner wire 262D is connected to a right end portion 263C of the front arm plate 263D. A right end portion 264A (corresponding to a "second end portion") of the rod 264 is connected to a lower end portion 263E of the rear arm plate 263B.

Figure 22:
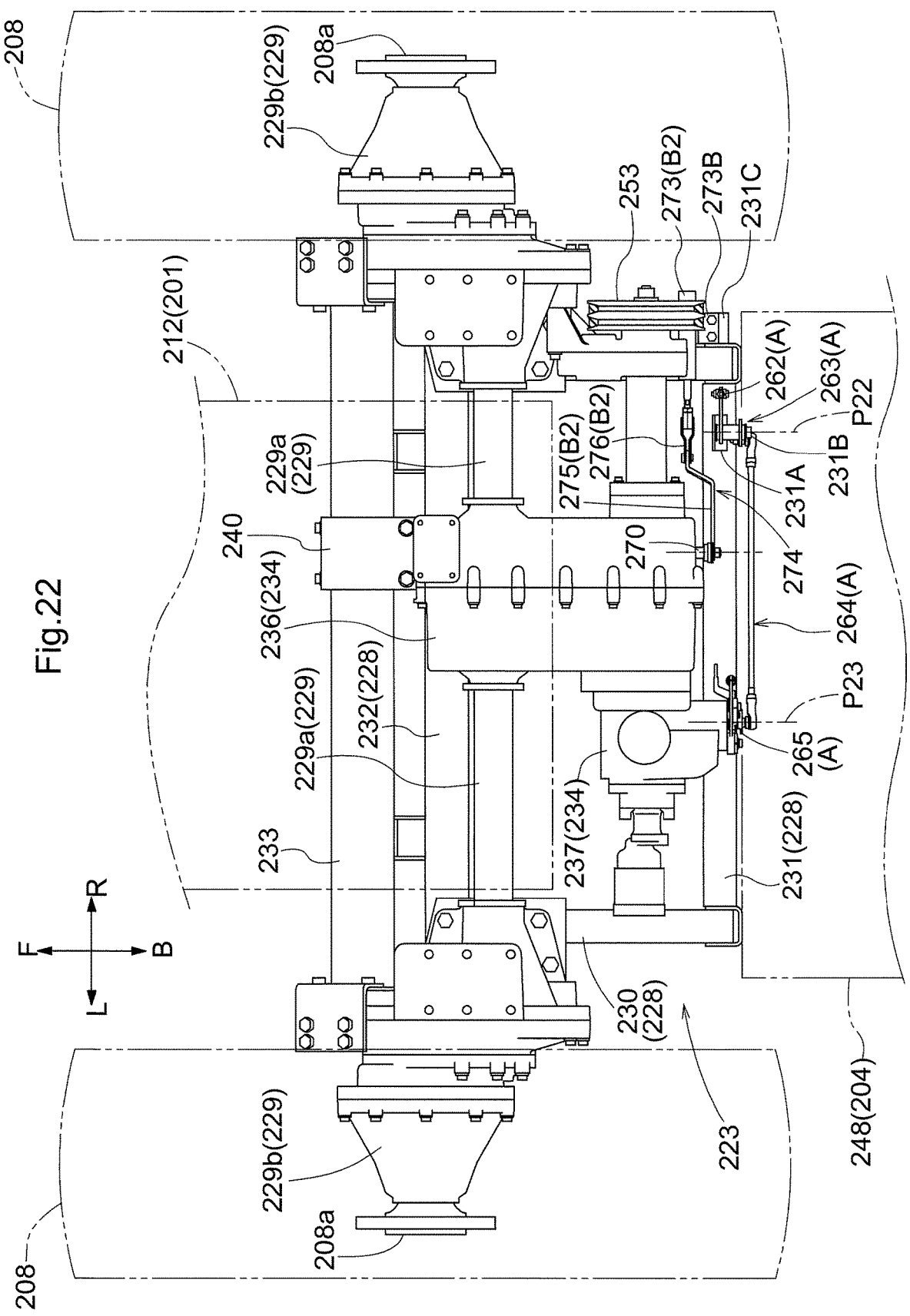
FIG. 22 is a plan view of a front coupling portion.

In the present embodiment, as shown in FIG. 22, the right end portion 263C of the front arm plate 263D is located outward (rightward) of the grain culm conveying device 212 in the body left-right direction.

Rod:

As shown in FIG. 22, the rod 264 is provided extending between the hydrostatic stepless transmission 237 (or transmission case 236) and the sorting portion 248 (threshing device 204) in the body left-right direction (corresponding to the "horizontal direction"). In other words, the rod 264, which is a portion of the transmission mechanism A, is provided extending in the horizontal direction between the hydrostatic stepless transmission 237 and the threshing device 204.

A shown in FIGS. 23, 24, and 26, the right end portion 264A of the rod 264 is connected to the lower end portion 263E of the rear arm plate 263B of the right arm portion 263. The left end portion 264B (corresponding to a "first end portion") of the rod 264 is connected to the lower end portion 265A of the left arm portion 265. As shown in FIG. 24, the rod 264 extends diagonally upward to the left from the right end portion 264A.

Left Arm Portion:

As shown in FIG. 24, the left arm portion 265 is attached to the trunnion shaft 260 of the hydrostatic stepless transmission 237 and extends downward from the trunnion shaft 260. The lower end portion 265A of the left arm portion 265 is connected to the left end portion 264B of the rod 264. The left arm portion 265, together with the trunnion shaft 260, can undergo swing displacement about the axis P23 along with the trunnion shaft 260.

The following can be said due to the transmission mechanism A being configured as described above. The left arm portion 265 (corresponding to a "first arm") is arranged between the trunnion shaft 260 of the hydrostatic stepless transmission 237 (corresponding to the "transmission apparatus") and the left end portion 264B of the rod 264 (corresponding to a "first end portion"). In other words, the left end portion 264B of the rod 264 is connected to the hydrostatic stepless transmission 237 via the left arm portion 265.

The right arm portion 263 (corresponding to a "second arm") is arranged between the right end portion 264A of the rod 264 (corresponding to a "second end portion") and the end portion 262F of the inner wire 262D (corresponding to a "third end portion"). In other words, the right end portion 264A of the rod 264 is connected to the end portion 262F of the inner wire 262D via the right arm portion 263.

The following describes how operation force applied to the main gearshift lever 261 is transmitted to the hydrostatic stepless transmission 237 by the transmission mechanism A with reference to FIG. 26.

The main gearshift lever 261 is arranged in the driver portion 203 so as to be capable of undergoing swing displacement about the axis P21 that extends in the body left-right direction. FIG. 26 shows the state where the main gearshift lever 261 is at a neutral position NL.

When the main gearshift lever 261 is moved forward and swings to a forward travel range FW1, the inner wire 262D connected to the arm end 261A is pulled toward the main gearshift lever 261, and moves relative to the outer casing 262A. The front arm plate 263D of the right arm portion 263 is pulled upward by the inner wire 262D, and the right arm portion 263 swings counterclockwise in a body forward view. The rod 264 is pulled by the rear arm plate 263B of the right arm portion 263 and moves diagonally downward to the right. Accordingly, the lower end portion 265A of the left arm portion 265 is pulled by the rod 264, and the left arm portion 265 swings counterclockwise in a body forward view, and swings to a forward travel range FW2. The trunnion shaft 260 of the hydrostatic stepless transmission 237 is rotated by the left arm portion 265, and the angle of the pump swash plate 257 changes to an angle that corresponds to the operation position of the main gearshift lever 261. Due to the operations described above, motive power input from the engine 221 to the input shaft 252 is adapted between the pump swash plate 257 and the motor swash plate 259, and transmitted to the front wheels 208 via the gear-type transmission mechanism 235 and the like, and thus the combine moves forward. The farther the main gearshift lever 261 is moved forward in the forward travel range FW1, the higher the stepless increase in the forward travel speed is.

When the main gearshift lever 261 is moved rearward and swings to a rearward travel range BW1, the inner wire 262D connected to the arm end 261A is pushed away from the main gearshift lever 261, and moves relative to the outer casing 262A. The front arm plate 263D of the right arm portion 263 is pushed downward by the inner wire 262D, and the right arm portion 263 swings clockwise in a body forward view. The rod 264 is pushed by the rear arm plate 263B of the right arm portion 263 and moves diagonally upward to the left. Accordingly, the lower end portion 265A of the left arm portion 265 is pushed by the rod 264, and the left arm portion 265 swings clockwise in a body forward view, and swings to a rearward travel range BW2. The trunnion shaft 260 of the hydrostatic stepless transmission 237 is rotated by the left arm portion 265, and the angle of the pump swash plate 257 changes to an angle that corresponds to the operation position of the main gearshift lever 261. Due to the operations described above, motive power input from the engine 221 to the input shaft 252 is adapted between the pump swash plate 257 and the motor swash plate 259, and transmitted to the front wheels 208 via the gear-type transmission mechanism 235 and the like, and thus the combine moves rearward. The farther the main gearshift lever 261 is moved rearward in the rearward travel range BW1, the higher the stepless increase in the rearward travel speed is.

Operation Mechanism:

In the present embodiment, the gear-type transmission mechanism 235 is configured such that the transmission state can be switched between a low speed state and a high speed state. The transmission state is switched by pivoting of a shift shaft 270.

Figure 27:
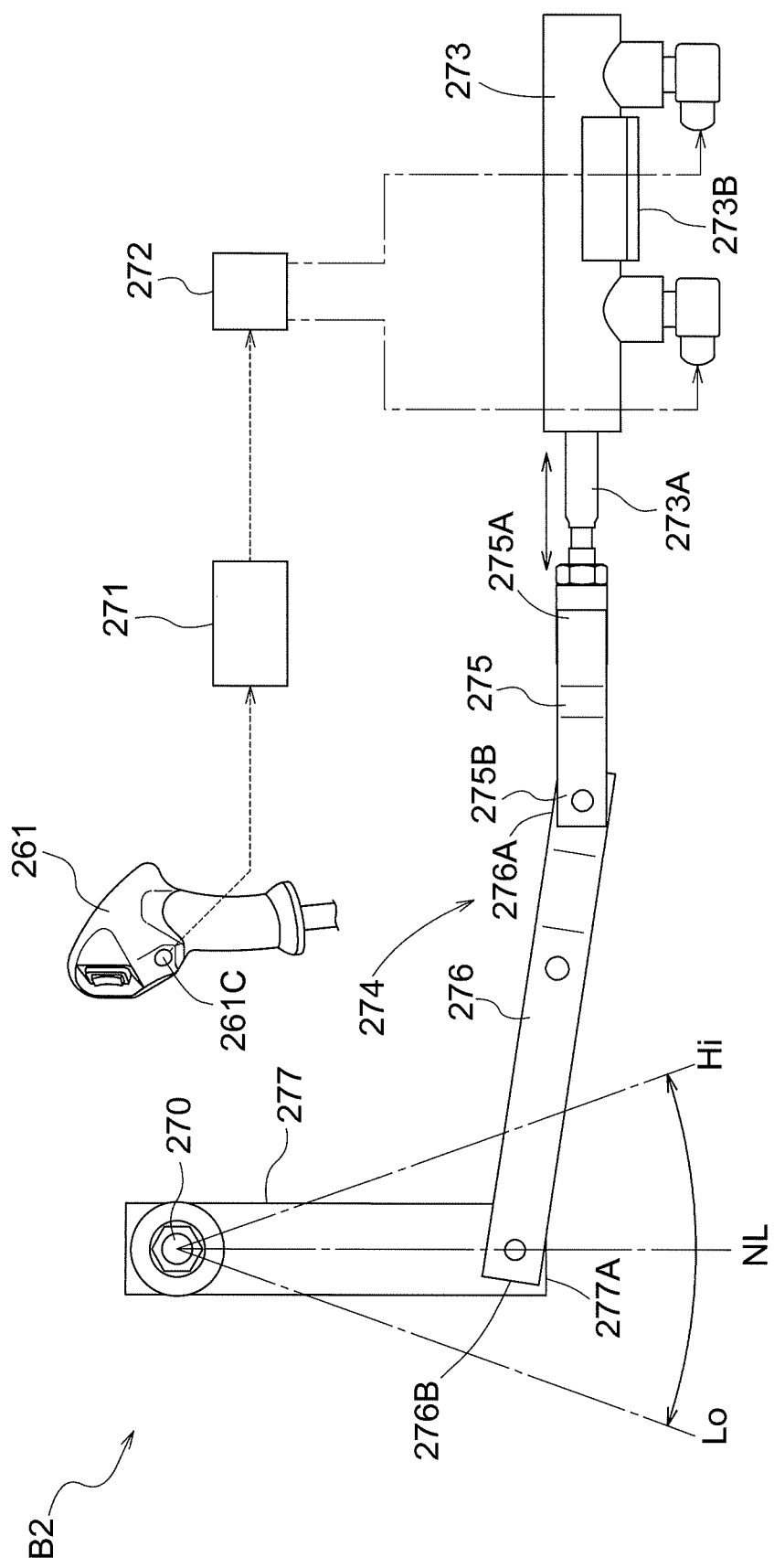
FIG. 27 is a schematic view of a configuration of the operation mechanism.

As shown in FIG. 27, a manual auxiliary gearshift switch 261C (corresponding to a "gear transmission operation tool") for instructing a switch of the transmission state of the gear-type transmission mechanism 235 is provided on the main gearshift lever 261 provided in the driver portion 203. As shown in FIG. 27, an operation mechanism B2 is provided for operating the gear-type transmission mechanism 235 in response to an operation performed on the auxiliary gearshift switch 261C. The operation mechanism B2 includes a control device 271, a valve unit 272, an actuator 273, and a link mechanism 274.

The control device 271 includes a microcomputer and executes control according to a preset control program. Information indicating an operating state of the auxiliary gearshift switch 261C is input to the control device 271. The control device 271 is configured to control the valve unit 272 based on the input information from the auxiliary gearshift switch 261C so as to control the operation of the actuator 273.

The valve unit 272 is configured to supply hydraulic fluid to the actuator 273 to extend and retract the actuator 273.

The actuator 273 is a hydraulic cylinder that extends and retracts upon receiving the supply of hydraulic fluid from the valve unit 272. A cylinder rod 273A of the actuator 273 is connected to the link mechanism 274. As shown in FIGS. 23 and 24, the actuator 273 is supported by a bracket 231C included in the rear lateral coupling body 231 of the lower horizontal frame 228. Specifically, a bracket 273B provided on the actuator 273 is attached to the bracket 231C by multiple bolts. The bracket 231C is provided projecting rightward from the right side surface of the rear lateral coupling body 231.

The link mechanism 274 transmits the movement of the actuator 273 to the shift shaft 270 of the gear-type transmission mechanism 235. The link mechanism 274 includes a right link plate 275, a left link plate 276, and a gearshift arm 277.

The right link plate 275 is a plate-shaped member that extends in the body left-right direction, and has a right end portion 275A that is connected to the cylinder rod 273A of the actuator 273, and a left end portion 275B that is connected to the left link plate 276.

The left link plate 276 is a plate-shaped member that extends in the body left-right direction, and has a right end portion 276A that is connected to the left link plate 276, and a left end portion 276B that is connected to the gearshift arm 277. As shown in FIG. 23, the left link plate 276 is bent in a crank shape between the right end portion 276A and the left end portion 276B. As shown in FIG. 22, the right end portion 276A is located in front of the left end portion 276B and is located in front of the rear end of the transmission case 236 as well. The left end portion 276B is located behind the actuator 273. The actuator 273 is located in front of the rear end of transmission case 236.

As shown in FIG. 22, the right link plate 275 and the left link plate 276 are provided extending in the body left-right direction (corresponding to the "horizontal direction") between the transmission case 236 and the sorting portion 248 (threshing device 204) extending. In other words, the right link plate 275 and the left link plate 276 of the link mechanism 274, which are a part of the operation mechanism B2, are provided in a state of extending in the horizontal direction between the gear-type transmission mechanism 235 and the threshing device 204.

As shown in FIG. 24, the gearshift arm 277 is attached to the shift shaft 270 of the gear-type transmission mechanism 235 and extends downward from the shift shaft 270. A lower end portion 277A of the gearshift arm 277 is connected to the left end portion 276B of the left link plate 276.

The following describes operation of the gear-type transmission mechanism 235 by the operation mechanism B2 in accordance with an operation performed on the auxiliary gearshift switch 261C, with reference to FIG. 27.

The auxiliary gearshift switch 261C is constituted by a push-operated switch that turns on only when pushed and turns off when pushing is stopped. When the auxiliary gearshift switch 261C is pushed, information indicating the on state is input from the auxiliary gearshift switch 261C to the control device 271.

Each time information indicating the on state is input, the control device 271 controls the actuator 273 via the valve unit 272 such that the transmission state of the gear-type transmission mechanism 235 switches between the high speed state, the neutral state, and the low speed state.

FIG. 27 shows a state in which the gear-type transmission mechanism 235 is in the neutral state, and the gearshift arm 277 is in the neutral position NL, which corresponds to the neutral state. In this state, when the auxiliary gearshift switch 261C is pushed, the control device 271 controls the valve unit 272 to supply hydraulic fluid to the actuator 273 such that the cylinder rod 273A moves leftward. When the cylinder rod 273A moves leftward, the right link plate 275 and the left link plate 276 move leftward. The gearshift arm 277 swings counterclockwise about the axis P23, and the gearshift arm 277 swings to a low speed position Lo, which corresponds to the low speed state. Due to the gearshift arm 277, the shift shaft 270 of the gear-type transmission mechanism 235 rotates, and the transmission state of the gear-type transmission mechanism 235 switches from the neutral state to the low speed state.

Next, when the auxiliary gearshift switch 261C is pushed, the control device 271 controls the valve unit 272 to supply hydraulic fluid to the actuator 273 such that the cylinder rod 273A moves rightward and returns to the state shown in FIG. 27. When the cylinder rod 273A moves rightward, the right link plate 275 and the left link plate 276 move rightward. The gearshift arm 277 swings clockwise about the axis P23, and the gearshift arm 277 swings to the neutral position NL, which corresponds to the neutral state. Due to the gearshift arm 277, the shift shaft 270 of the gear-type transmission mechanism 235 rotates, and the transmission state of the gear-type transmission mechanism 235 switches from the low speed state to the neutral state.

Next, when the auxiliary gearshift switch 261C is pushed, the control device 271 controls the valve unit 272 to supply hydraulic fluid to the actuator 273 such that the cylinder rod 273A moves rightward. When the cylinder rod 273A moves rightward, the right link plate 275 and the left link plate 276 move rightward. The gearshift arm 277 swings clockwise about the axis P23, and the gearshift arm 277 swings to a high speed position Hi, which corresponds to the high speed state. Due to the gearshift arm 277, the shift shaft 270 of the gear-type transmission mechanism 235 rotates, and the transmission state of the gear-type transmission mechanism 235 switches from the neutral state to the high speed state.

Thereafter, each time the auxiliary gearshift switch 261C is pushed, the transmission state of the gear-type transmission mechanism 235 switches from the high speed state to the neutral state and from the neutral state to the low speed state. As described above, the operation mechanism B2 operates the gear-type transmission mechanism 235 in accordance with operations performed on the auxiliary gearshift switch 261C.

Variations of Third Embodiment

The following describes modifications of the embodiment described above. The matter other than the matter described in the following variations is similar to the matter described above embodiment. The above embodiment and the following variations may be appropriately combined as long as no contradiction arises. The scope of the present invention is not limited to the above-described embodiment and the following variations.

(1) In the above embodiment, an example is described in which the connection portion (the end portion 262E of the operation wire 262) between the operation wire 262 and the right arm portion 263 is located outward (rightward) of the grain culm conveying device 212 in the body left-right direction. The entirety of the right arm portion 263 or the right end 264A of the rod 264 may be located outward (rightward) of the grain culm conveying device 212 in the body left-right direction. This is preferable due to further improving the ease-of-maintenance of the transmission mechanism A.

(2) In the above embodiment, an example is described in which the front lateral coupling body 232 of the lower horizontal frame 228 is connected to the transmission case 236 via the axle case 229, the lateral pipe frame 233, and the coupling member 240. An aspect is possible in which the lower horizontal frame 228 and the transmission case 236 are directly connected to each other.

(3) In the above embodiment, the transmission mechanism A includes one operation wire 262 and one rod 264, but the transmission mechanism A may include multiple operation wires and multiple rods.

(4) In the above embodiment, the gear-type transmission mechanism 235 is described as being configured to switch between two states, namely the low speed state and the high speed state, but may be configured to switch between three or more transmission states.

(5) Although an example in which the actuator 273 is a hydraulic cylinder is described in the above embodiment, the actuator may be a motorized actuator such as a motorized cylinder or an electric motor.

INDUSTRIAL APPLICABILITY

The present invention is applicable to not only a combine that has front wheels and rear wheels, but also a combine that has a crawler-type traveling device or a traveling device that includes a combination of wheels and a mini crawler.

Also, the present invention is applicable to a harvester that harvests a standing crop while traveling, and is further applicable to not only a normal-type combine, but also an autodetachable combine, a corn harvester, and the like.

DESCRIPTION OF REFERENCE SIGNS

First Embodiment

7 Harvesting unit
10 Threshing device
11 Threshing tank
12 Threshing discharge device
20 Lower tapered portion
20a Bottom section
20b Side plate portion
20S Inward surface
22 Bottom screw
26 Inspection port
27 Lid
27a Outer lid portion
27b Inner lid portion
27c Lid bottom plate portion
27d Lid side plate portion
27S Inward surface
28 Hinge member
29 Coupling shaft
31 Lock mechanism
31a Screw shaft
31b Nut
32 Elongated hole portion Second Embodiment 107 Harvesting unit
110 Threshing device
111 Threshing tank
130 Supply/convey device
133 Conveying case
135 Drive sprocket (drive rotating body)
136 Driven sprocket (driven rotating body)
137 Support shaft
138 Support arm
140 Endless chain (endless rotating body)
141 Conveying body
142 Conveying surface
142a Conveying-end-side conveying surface portion
142b Conveying surface portion other than conveying-end-side conveying surface portion
143 Conveying path
151 Guide rod
152 Second holding member
153 Connecting member
154 Coupling body
155 Adjustment rod
156 First holding member
157 Positioning mechanism
160 Position adjustment mechanism Third Embodiment 203 Driver portion
204 Threshing device
208 Front wheel (traveling device)
208a Wheel shaft 211 Reaping header (harvesting unit)
212 Grain culm conveying device (conveying device)
222 Main frame (support frame)
222B Bracket (support portion)
228 Lower horizontal frame (connecting frame)
229 Axle case (drive shaft case)
235 Gear-type transmission mechanism (gear transmission apparatus)
237 Hydrostatic stepless transmission (transmission apparatus)
238 Travel drive shaft (drive shaft)
261 Main gearshift lever (transmission operation tool)
261C Auxiliary gearshift switch (gear transmission operation tool)
262 Operation wire
262A Outer casing
262E End portion (fourth end portion)
262F End portion (third end portion)
263 Right arm portion (second arm)
264 Rod
265 Left arm portion (first arm)
273 Actuator
274 Link mechanism
A Transmission mechanism
B2 Operation mechanism

The invention claimed is:

1. A combine comprising:
a threshing device configured to thresh a harvested product harvested by a harvesting unit;
a threshing tank that is configured to store a threshing product obtained by the threshing device, is provided above the threshing device, and includes a lower tapered portion formed in a bottom portion;
a bottom screw that is provided inside the lower tapered portion, extends along a horizontal width of the combine, and is configured to discharge the threshing product from the threshing tank;
a threshing discharge device that is connected to the bottom screw and is configured to convey the threshing product from the bottom screw and discharge the threshing product in a body outward direction; and
a ceiling plate that is provided to an upper portion of the threshing device, expands upward in a cross-sectional view along the front-back direction of the combine,
wherein the threshing tank includes an inspection port formed in a bottom section of the lower tapered portion, and a lid configured to open and close the inspection port, and
wherein the lid opens and closes by swinging upward and downward about a swing axis that is not parallel with a screw axis of the bottom screw in a free space between the bottom section of the threshing tank and the ceiling plate of the threshing device.

2. The combine according to claim 1,
wherein the lid includes a lid bottom plate portion and a pair of lid side plate portions that rise upward from respective lateral end portions of the lid bottom plate portion, and
wherein the pair of lid side plate portions are inclined so as to extend along a side plate portion of the lower tapered portion such that a gap between the lid side plate portions becomes wider toward an upper end side of the lid side plate portions.

3. The combine according to claim 2,
wherein the lid includes an inner lid portion that is located inside the inspection port and is flush with an inward surface of the lid bottom plate portion and an inward surface of the bottom section when the lid is in a closed state, and an outer lid portion that comes into contact with an outward surface of the bottom section around the inspection port, wherein the combine further comprises a hinge member that extends between the lid bottom plate portion and the bottom section and is configured to support the lid to the lower tapered portion so as to be capable of swinging open and closed, wherein a coupling shaft that couples the hinge member to the bottom section projects outward from the bottom section, and wherein a lock mechanism configured to fix the lid in the closed state includes a screw shaft that projects outward from the lower tapered portion, an elongated hole portion formed in the lid side plate portion, and a nut configured to be fastened to the screw shaft that has been inserted through the elongated hole portion.

4. The combine according to claim 1,
wherein the axis is located at an end portion of the lid that is on an upstream side in a conveying direction of the bottom screw.

5. The combine according to claim 1,
wherein the inspection port is biased toward a side on which the threshing discharge device is located relative to a center of the bottom section in a conveying direction of the bottom screw.

6. The combine according to claim 2,
wherein the axis is located at an end portion of the lid that is on an upstream side in a conveying direction of the bottom screw.

7. The combine according to claim 2,
wherein the inspection port is biased toward a side on which the threshing discharge device is located relative to a center of the bottom section in a conveying direction of the bottom screw.

* * * * *